United States Patent
Harmon et al.

(10) Patent No.: US 7,357,193 B2
(45) Date of Patent: Apr. 15, 2008

(54) AIR SEEDER DISC SCRAPER

(75) Inventors: Barry Harmon, Scobey, MT (US); Bruce Dighans, Scobey, MT (US)

(73) Assignee: Air Design, Inc., Scobey, MT (US)

( * ) Notice: Subject to any disclaimer, the term of this patent is extended or adjusted under 35 U.S.C. 154(b) by 374 days.

(21) Appl. No.: 11/230,163

(22) Filed: Sep. 19, 2005

(65) Prior Publication Data

US 2007/0062714 A1    Mar. 22, 2007

(51) Int. Cl.
A01B 15/16     (2006.01)
A01B 23/06     (2006.01)

(52) U.S. Cl. .................................. 172/566; 172/610
(58) Field of Classification Search ........ 172/558–564, 172/566, 570, 572, 606, 610; 111/163, 167, 111/52, 191, 139–141
See application file for complete search history.

(56) References Cited

U.S. PATENT DOCUMENTS

| | | | |
|---|---|---|---|
| 744,711 A | 11/1903 | Bills | |
| 832,938 A | 10/1906 | Waterman | |
| 1,721,876 A | 7/1929 | Davis et al. | |
| 1,723,705 A | 8/1929 | Packer | |
| 1,837,347 A | 12/1931 | Vandine | |
| 2,045,762 A | 6/1936 | Elliott | |
| 3,261,411 A | 7/1966 | Youngberg | |
| 3,833,067 A | 9/1974 | Perterson, Jr. et al. | |
| 4,008,770 A | 2/1977 | Boone et al. | |
| 4,113,030 A | 9/1978 | Walker | |
| 4,127,179 A | 11/1978 | Heersink et al. | |
| 4,330,041 A | 5/1982 | Ankenman | |
| 4,858,699 A | 8/1989 | Poltrock | |
| 4,883,126 A | 11/1989 | Leland | |
| 4,998,488 A | 3/1991 | Hansson | |
| 5,060,586 A | 10/1991 | Hoyt | |
| 5,318,133 A | 6/1994 | Logue | |
| 5,507,351 A | 4/1996 | Martin | |
| 6,024,179 A | 2/2000 | Bourgault | |
| 6,223,832 B1 | 5/2001 | Hook et al. | |
| 6,237,696 B1 | 5/2001 | Mayerle | |
| 6,260,632 B1 | 7/2001 | Bourgault et al. | |
| 6,386,127 B1 | 5/2002 | Prairie et al. | |
| 6,874,584 B2 | 4/2005 | Butterfield et al. | |

Primary Examiner—Christopher J. Novosad
(74) Attorney, Agent, or Firm—Antoinette M. Tease

(57) ABSTRACT

A scraper for a single-disc opener air seeder, comprising a mounting bracket, scraper attachment member, scraper plate, scraper edge containment member, scraper edge, bolt, spring, and nut, wherein the scraper attachment member is attached to the mounting bracket by the bolt, wherein the mounting bracket comprises a main surface, wherein the bolt comprises a top end, wherein the nut is screwed onto the top end of the bolt, wherein the spring lies between the main surface of the mounting bracket and the nut on the top end of the bolt, wherein the scraper attachment member is connected to the scraper plate, wherein the scraper plate is connected to the scraper edge containment member, and wherein the scraper edge containment member is connected to the scraper edge. Two different embodiments of the mounting bracket for installation on the seed/fertilizer boot and depth wheel sides of the opener disc.

7 Claims, 24 Drawing Sheets

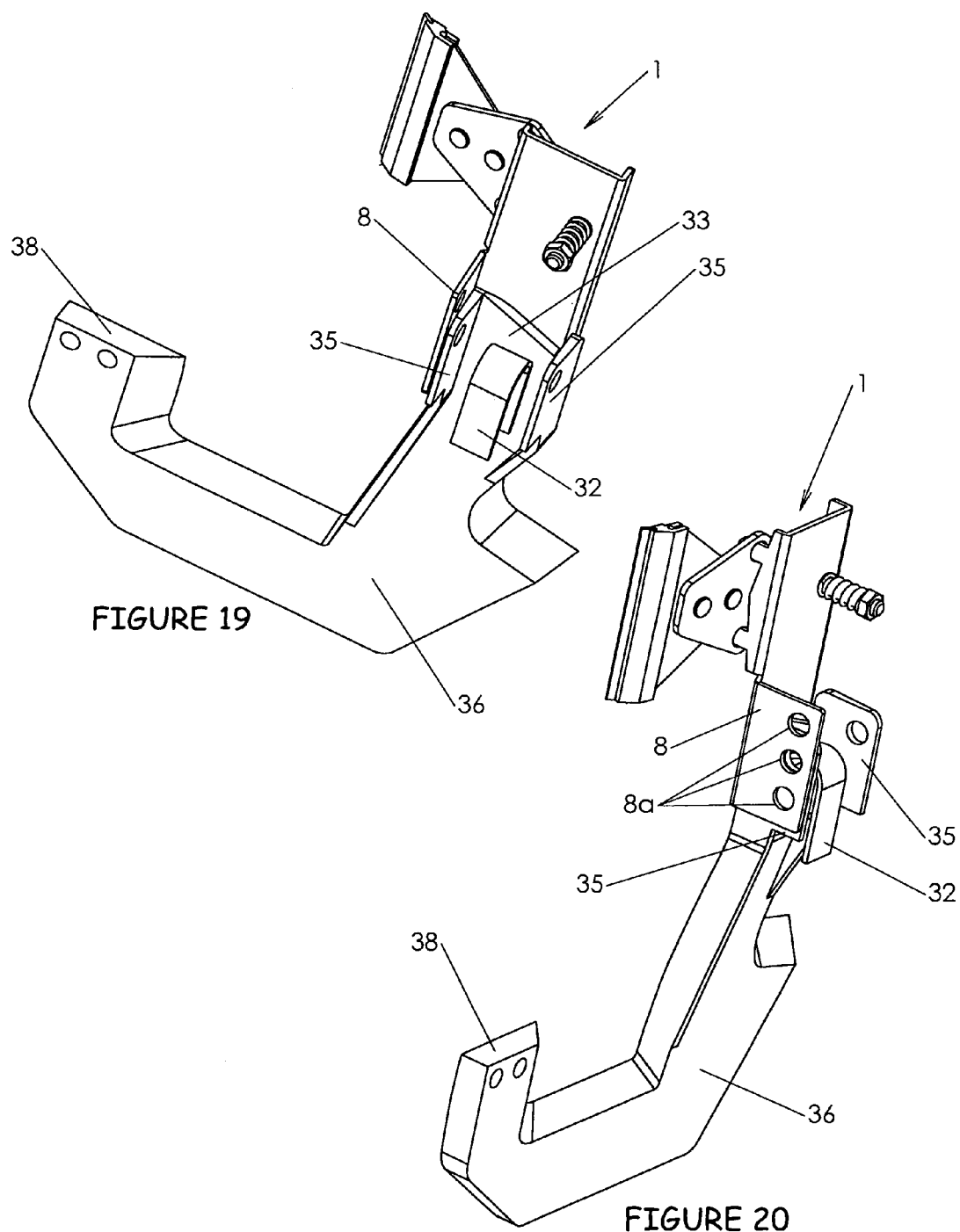

AIR SEEDER DISC SCRAPER

BACKGROUND OF THE INVENTION

1. Field of the Invention

The present invention relates generally to the field of agricultural equipment, and more specifically, to a scraper for the seed boot and depth wheel sides of the opener disc on a John Deere 90-Series single-disc opener air seeder.

2. Description of the Related Art

A number of different types of scrapers have been patented, but none is specifically designed for the John Deere 90-Series single-disc opener air seeder. For that reason, none of the scrapers discussed below has the unique mounting system of the present invention. In addition, none of the prior art scrapers is designed for use on the depth wheel side of the disc of an air seeder, as is one of the embodiments in the present invention.

U.S. Pat. No. 6,386,127 (Prairie et al., 2002) provides a disc opener assembly for a seed planter manufactured by Case Corporation of Racine, Wis. The disc opener assembly includes a disc scraper that self-aligns with the disc (on the seed boot side) and maintains contact with the disc as the scraper edge wears. The claimed self-alignment is effectuated by a spring located between the scraper and the scraper mount. As shown in FIGS. 5 and 6 of the '127 patent, the scraper described by Prairie et al. is not at all similar to the present invention in terms of size, shape, location on the disc, or the way it mounts to the disc.

U.S. Pat. No. 6,237,696 (Mayerle, 2001) shows another type of scraper for an air seeder disc. The scraper described in the '696 patent is specifically designed for the air seeder manufactured by Flexi-Coil Ltd. of Saskatchewan, Canada. According to the inventors, the scraper flexes against the disc to compensate for deflections in the disc blade as it displaces the soil. This flexibility is provided by a thick resilient pad of rubber or rubber-like material secured between the scraper mount and the mounting region of the scraper plate. The upper end of the scraper plate is held firm against the resilient pad by two fasteners, which partially constrain the scraper deflection. The alignment of the scraper edge against the disc surface will change slightly depending on whether and to what extent both fasteners are tightened. As with the Prairie scraper, the scraper described in the '696 patent is dissimilar to the present invention in terms of both design and function.

U.S. Pat. No. 6,874,584 (Butterfield et al., 2005) involves another scraper for an air seeder, but this particular scraper is designed for an air seeder manufactured by Bourgault Industries Ltd. of Saskachewan, Canada. The scraper described in this patent is oriented so that it is in close proximity to or touching the lower portion of the trailing face of the disc adjacent to an outer edge of the disc. The scraper is adjustably attached so that the scraper blade can be moved inward and away from the edge of the disc as the disc edge wears. The scraper is biased against the face of the disc by a coil spring attached to the scraper bracket. As with the previous two scrapers described herein, the Butterfield scraper would not work on a John Deere 90-Series single-disc opener air seeder because it is specifically designed for the air seeder of another manufacturer.

The present invention is a scraper for a single-disc opener air seeder. An air seeder is sometimes referred to as an air dill. An air seeder or air drill is a seeding tool which has many furrow "openers." The term "opener" refers to the fact that the machine is "opening" the ground or making a furrow for the reception of seed. There are double-disc openers as well, and there are scrapers that have been designed specifically for such double-disc openers. Examples include U.S. Pat. No. 5,318,133 (Logue, 1994), U.S. Pat. No. 5,060,586 (Hoyt, 1991), and U.S. Pat. No. 744,711 (Bills, 1903).

Scrapers have also been designed for various types of ground tillage implements. Examples of these types of scrapers include U.S. Pat. No. 6,260,632 (Bourgault et al., 2001); U.S. Pat. No. 6,223,832 (Hook et al., 2001); U.S. Pat. No. 6,024,179 (Bourgault, 2000); U.S. Pat. No. 5,507,351 (Martin, 1996); U.S. Pat. No. 4,858,699 (Poltrock, 1989); U.S. Pat. No. 4,330,041 (Ankenman, 1982); U.S. Pat. No. 4,127,179 (Heersink et al., 1978); U.S. Pat. No. 4,113,030 (Walker, 1978); U.S. Pat. No. 4,008,770 (Boone et al., 1977); U.S. Pat. No. 3,833,067 (Peterson, Jr., et al., 1974); U.S. Pat. No. 3,261,411 (Youngberg et al., 1966); U.S. Pat. No. 1,837,347 (Vandine, 1931); U.S. Pat. No. 1,723,705 (Packer, 1929); U.S. Pat. No. 1,721,876 (Davis et al., 1929); and U.S. Pat. No. 832,938 (Waterman 1906). U.S. Pat. No. 4,883,126 (Leland, 1989) involves a scraper for a ridge till planter.

BRIEF SUMMARY OF THE INVENTION

The present invention is a scraper for a single-disc opener air seeder, comprising a mounting bracket, a scraper attachment member, a scraper plate, a scraper edge containment member, a scraper edge, a bolt, a spring, and a nut, wherein the scraper attachment member is attached to the mounting bracket by the bolt, wherein the mounting bracket comprises a main surface, wherein the bolt comprises two ends, wherein the nut is screwed onto one end of the bolt, wherein the spring lies between the main surface of the mounting bracket and the nut on the end of the bolt, wherein the scraper attachment member is connected to the scraper plate, wherein the scraper plate is connected to the scraper edge containment member, and wherein the scraper edge containment member is connected to the scraper edge. The scraper attachment member is preferably angled downward, and the angle is preferably in the range of seven (7) to ten (10) degrees. The mounting bracket and scraper attachment member are preferably comprised of mild steel, the scraper plate is preferably comprised of stainless steel, the scraper edge containment member is preferably comprised of aluminum, and the scraper edge is preferably comprised of tungsten carbide.

In one embodiment, the mounting bracket further comprises an angled support member, an attachment arm, and a supporting flange, wherein the angled support member comprises two angled edges, a center point, and two support protrusions, wherein the scraper attachment member comprises two apertures, wherein the support protrusions extend through the apertures in the scraper attachment member, wherein the angled edges of the angled support member, in combination with the spring, allow the scraper attachment member to rock from one side to another, wherein the attachment arm comprises three apertures, wherein the attachment arm is roughly perpendicular to the main surface of the mounting bracket, wherein the air seeder to which the scraper attaches comprises an installation bracket, wherein the installation bracket comprises three apertures, and wherein when the scraper is installed, the three apertures on the attachment arm of the scraper line up with the three apertures on the installation bracket on the air seeder.

In this embodiment, the air seeder to which the scraper attaches comprises an opener disc, wherein the opener disc is beveled on one side, wherein the scraper is installed on the side of the opener disc that has the beveled edge, and wherein when the scraper is installed, the scraper edge extends from the beginning of the beveled edge on the opener disc inward In a second embodiment, the mounting bracket further comprises a front face, a rear face, and two embracing flanges, wherein the front face comprises two support protrusions, wherein the scraper attachment member comprises two apertures, wherein the support protrusions extend through the apertures in the scraper attachment member, wherein the air seeder to which the scraper attaches comprises a depth wheel and an attachment arm for the depth wheel, wherein the scraper slides onto the attachment arm, and the two embracing flanges of the scraper hold the scraper onto the attachment arm. In this embodiment, the front face preferably extends the entire length of the mounting bracket, the rear face preferably extends approximately halfway across the length of the mounting bracket, and each of the embracing flanges preferably extends approximately halfway across the length of the mounting bracket.

In this embodiment, the air seeder to which the scraper attaches comprises an opener disc, wherein the opener disc is beveled on one side, wherein the scraper is installed on the side of the opener disc that does not have a beveled edge, wherein the opener disc has an outer edge, and wherein when the scraper is installed, the scraper edge extends from the outer edge of the opener disc inward.

BRIEF DESCRIPTION OF THE DRAWINGS

FIG. 19 is a side perspective view of the fertilizer boot in relation to the fertilizer boot side scraper.

FIG. 20 is a rear perspective view of the fertilizer boot in relation to the fertilizer boot side scraper.

REFERENCE NUMBERS

Figure 1:
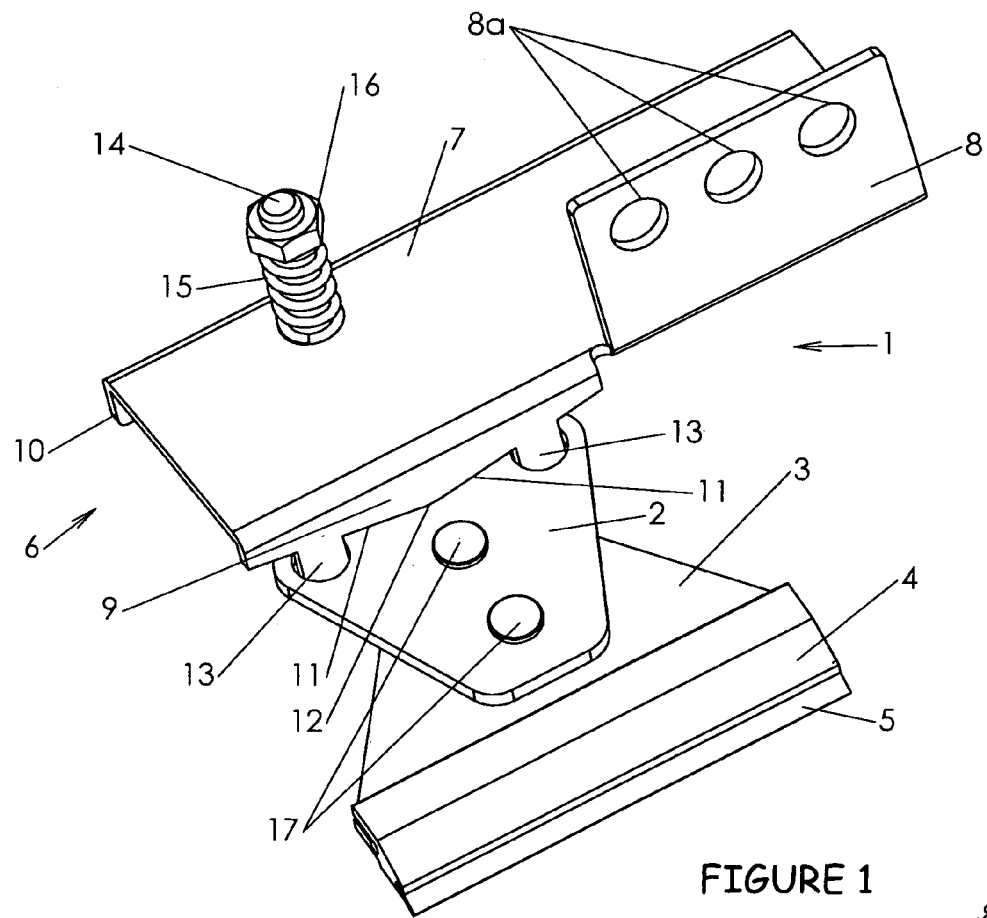
FIG. 1 is a front perspective view of the seed/fertilizer boot side scraper.

1 Seed/fertilizer boot side scraper
2 Scraper attachment member
3 Scraper plate
4 Scraper edge containment member
5 Scraper edge
6 Mounting bracket
7 Main surface (of mounting bracket)
8 Attachment arm
8a Aperture (on attachment arm)
9 Angled support member
10 Supporting flange
11 Angled edge
12 Center point
13 Support protrusion
14 Primary bolt
15 Spring
16 Nut (on primary bolt)
17 Rivet
18 Aperture (on scraper attachment member)
19 Seeding row unit
20 Depth wheel
21 Opener disc
21a Beveled edge (of opener disc)
22 Seed boot
23 Installation bracket
24 Lateral face (of bracket)
25 Aperture (on installation bracket)
26 Nut (on pivot bolt)
27 Receptacle (for seed tube)
28 Seed firming wheel
29 Closing wheel
30 Pivot bolt
31 Adjustment mechanism (for the depth wheel)
32 U-spring
33 Backstop (of seed or fertilizer boot)
34 Backstop (of installation bracket)
35 Lateral sides (of seed or fertilizer boot)
36 Fertilizer boot
37 Fertilizer tube 37 End (of fertilizer boot)
39 Depth wheel side scraper
40 Front face
41 Rear face
42 Embracing flange
43 Aperture (on main surface of mounting bracket)
44 Depth wheel adjustment arm
45 Aperture (on depth wheel adjustment arm)

DETAILED DESCRIPTION OF INVENTION

The goal of the present invention is to improve the functionality of the John Deere 90-Series single-disc opener air seeder by removing soil or other debris from the depth wheel and seed or fertilizer boot sides of the opener disc. The buildup of soil, debris, or frost from anhydrous ammonia (a fertilizer) on the depth wheel side of the disc can prevent the depth wheel from functioning properly, and it can also cause the rubber on the depth wheel to wear prematurely. The presence of soil or debris on the seed/fertilizer boot side of the opener disc can force the seed or fertilizer boot to pull away from the disc. This misalignment in turn causes undue wear on the seed or fertilizer boot, which lies directly adjacent to the opener disc, and it also prevents the seed or fertilizer from being deposited in the furrow created by the opener disc because the seed or fertilizer boot is no longer lined up with the furrow. Thus, the main purpose of the air seeder, which is to achieve proper seed or fertilizer placement, is thwarted.

Thus, it is an object of the present invention to provide a scraper that will keep both sides of the opener disc clean and free from soil or debris. It is a further object of the present invention to provide two different embodiments of the scraper—one for the depth wheel side and one for the seed/fertilizer boot side—that have all parts in common other than the mounting bracket. In addition, it is an object of the present invention to design a seed/fertilizer boot side scraper that will work with both the seed boot and the fertilizer boot without any change in parts.

FIG. 1 is a perspective view of the seed/fertilizer boot side scraper 1. This figure shows the scraper attachment member 2, the scraper plate 3, the scraper edge containment member 4, and the scraper edge 5. It also shows the scraper mounting bracket 6, which comprises a main surface 7, an attachment arm 8, an angled support member 9, and a supporting flange 10. The angled support member 9 comprises an angled edge 11 with a center point 12, as well as two support protrusions 13. Finally, this figure shows the primary bolt 14 that holds scraper attachment member 2 to the main surface 7 of the mounting bracket 6. A spring 15 between the main surface 7 and the nut 16 at the top of the primary bolt 14 allows the scraper attachment member 2 to rock from one side of the angled edge 11 to the other. The purpose of the two support protrusions 13 is to maintain the scraper in position when it is rocking from side to side.

The mounting bracket 6, scraper attachment member 2, scraper plate 3, scraper edge containment member 4, and scraper edge 5 can all be made out of any suitably rigid and durable material or materials. In the preferred embodiment, the mounting bracket 6 and scraper attachment member 2 are made out of mild steel, the scraper plate 3 is made out of stainless steel, the scraper edge containment member 4 is preferably made out of aluminum, and the scraper edge 5 is made out of tungsten carbide.

Figure 2:
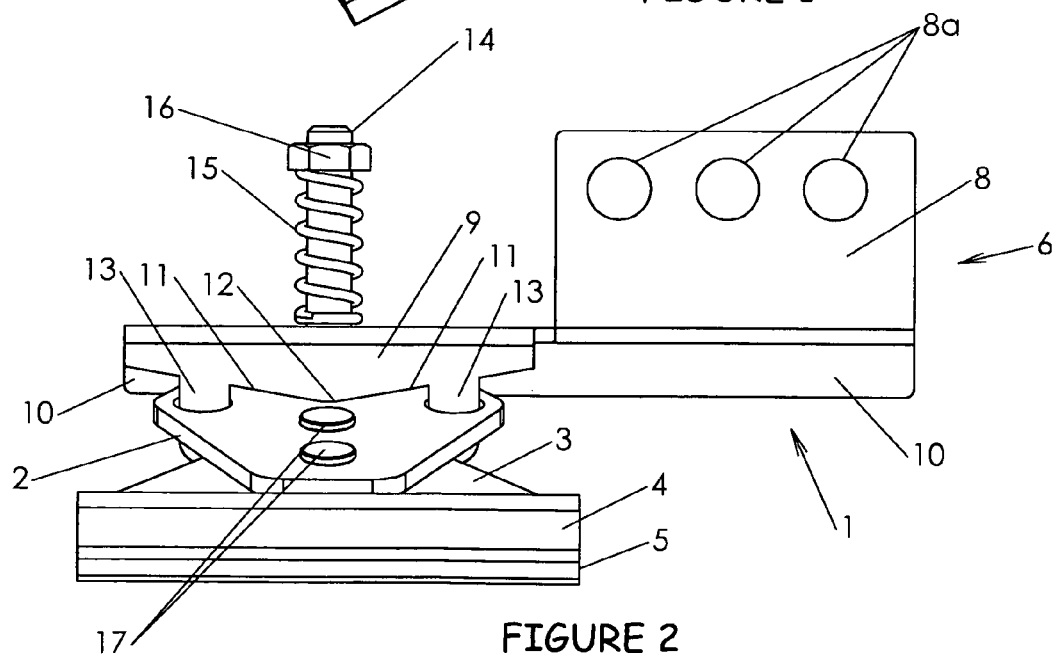
FIG. 2 is a front view of the seed/fertilizer boot side scraper.

FIG. 2 is a front view of the seed/fertilizer boot side scraper 1. This figure shows the same parts as in FIG. 1, except from a slightly different angle. As shown in this figure, the supporting flange 10 extends the entire length of the mounting bracket.

Figure 3:
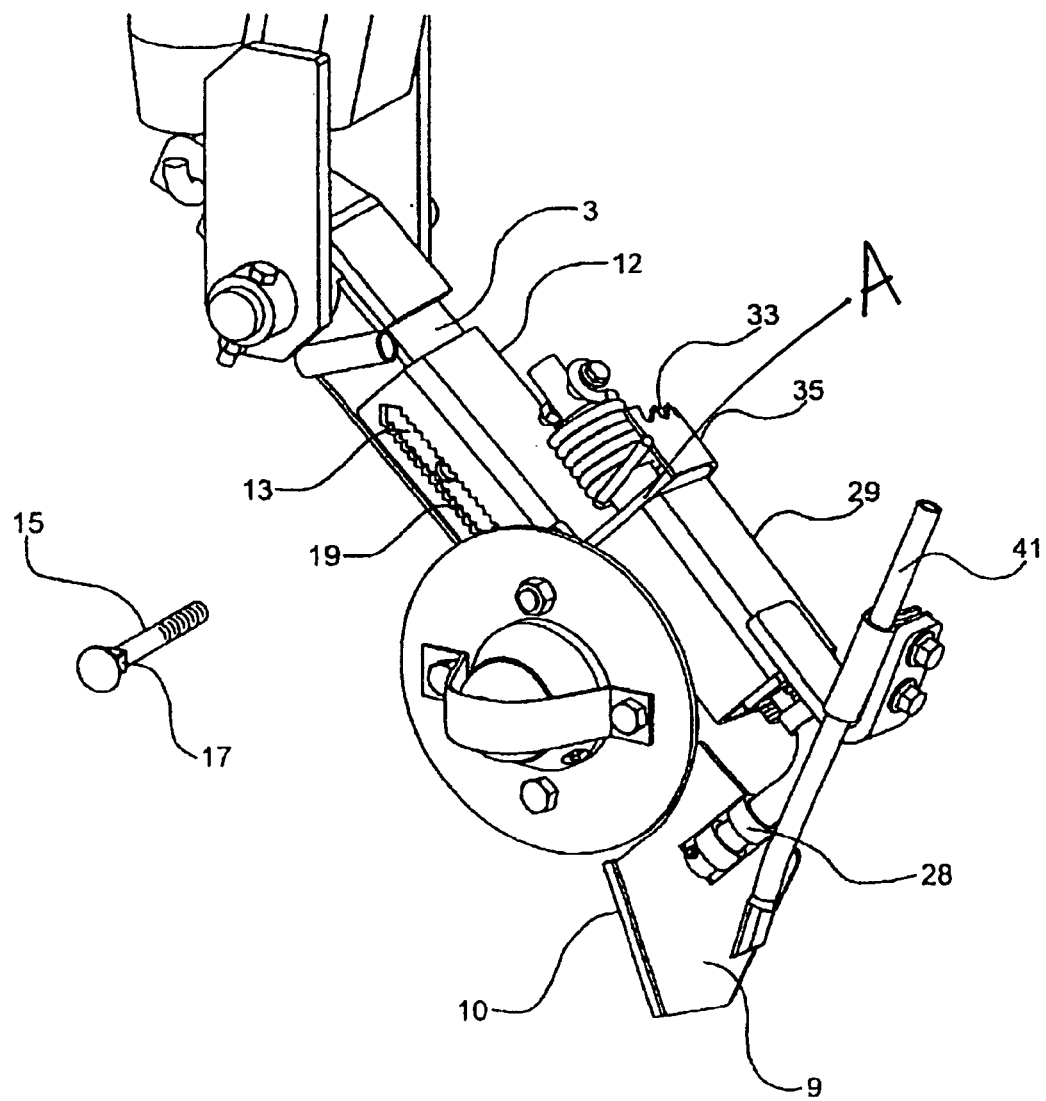
FIG. 3 is a side view of the seed/fertilizer boot side scraper.

FIG. 3 is a side view of the seed/fertilizer boot side scraper 1. This figure shows the scraper attachment member 2, the scraper plate 3, the scraper edge containment member 4, and the scraper edge 5. It also shows the main surface 7, attachment arm 8, angled support member 9, and supporting flange 10 of the mounting bracket. The support protrusions 13 are shown, as are the primary bolt 14, spring 15, and nut 16 on top of the primary bolt 14. Two rivets 17 connect the scraper plate 3 to the scraper attachment member 2. The scraper plate 3 could also be attached to the scraper attachment member 2 with bolts. Preferably, the angle shown as angle "A" in this figure is between seven (7) and ten (10) degrees. The angle shown as angle "B" is preferably slightly less than ninety (90) degrees in order to provide the best fit for the fertilizer boot.

Figure 4:
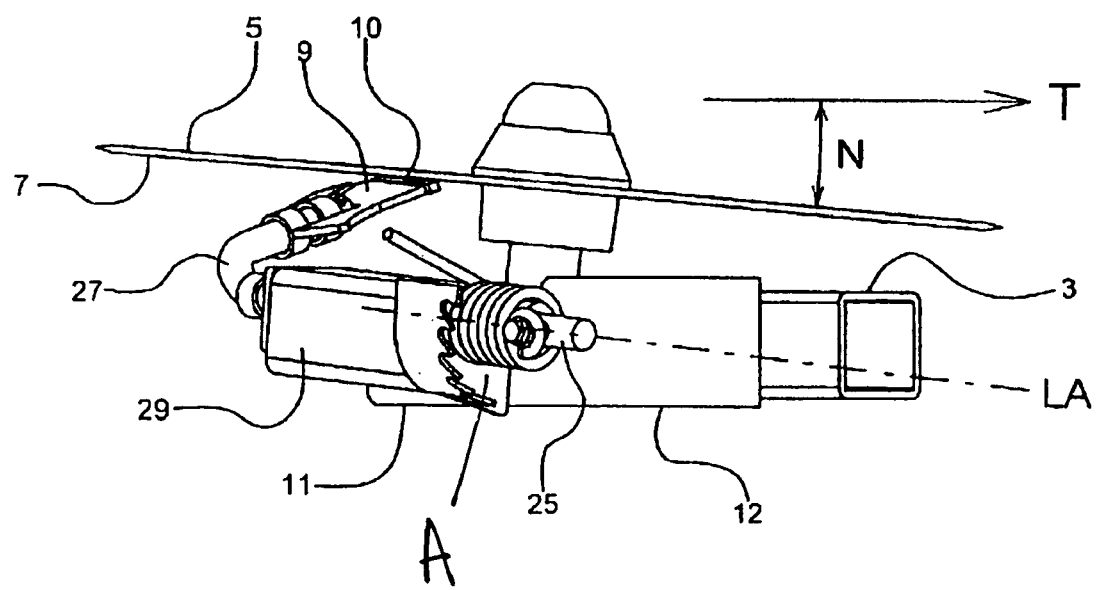
FIG. 4 is a rear view of the seed/fertilizer boot side scraper.

FIG. 4 is a rear view of the seed/fertilizer boot side scraper 1. This figure shows the scraper attachment member 2, the scraper plate 3, the scraper edge containment member 4, and the scraper edge 5. It also shows the attachment arm 8 and supporting flange 10 of the mounting bracket 6. The support protrusions 13 of the angled support member 9 (not shown) are also shown, as are the primary bolt 14, rivets 17, spring 15 and nut 16.

Figure 5:
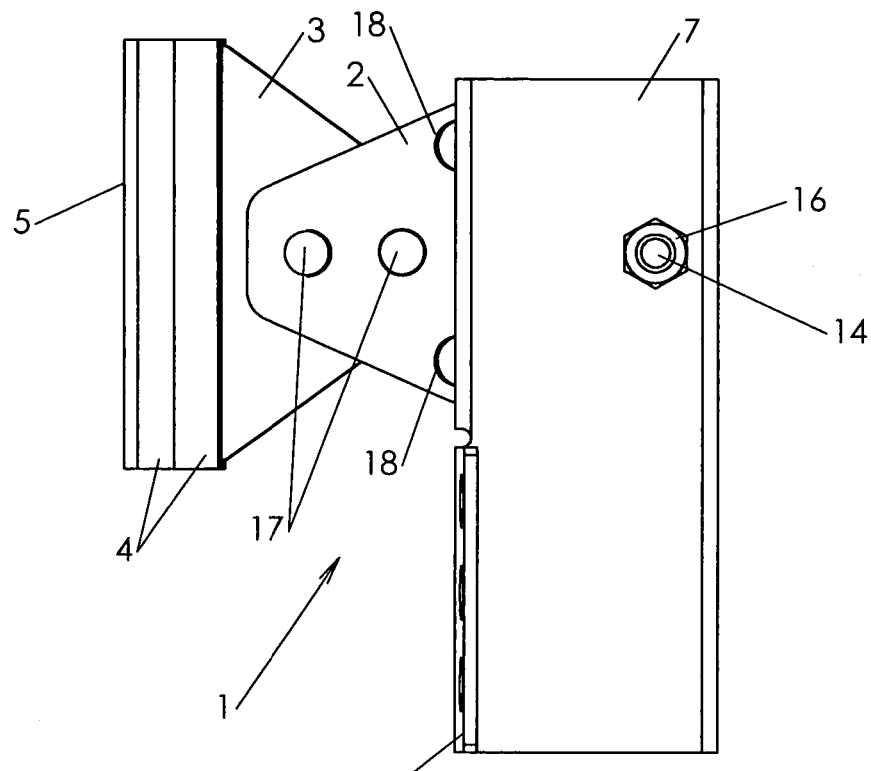
FIG. 5 is a top view of the seed/fertilizer boot side scraper.
Figure 6:
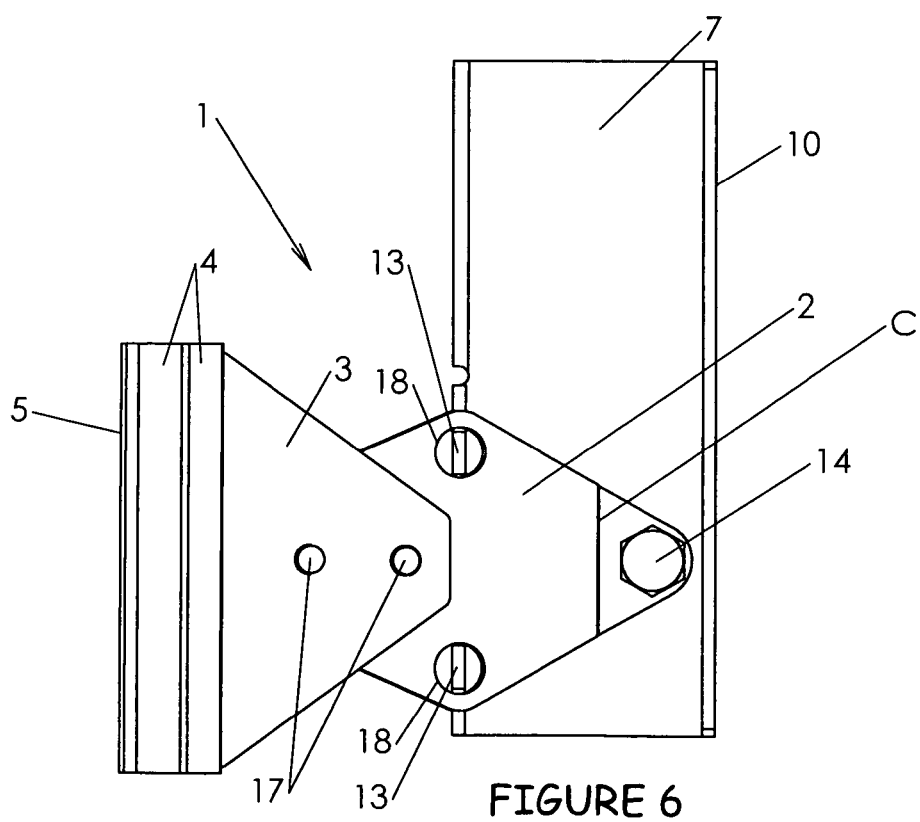
FIG. 6 is a bottom view of the seed/fertilizer boot side scraper.
Figure 7:
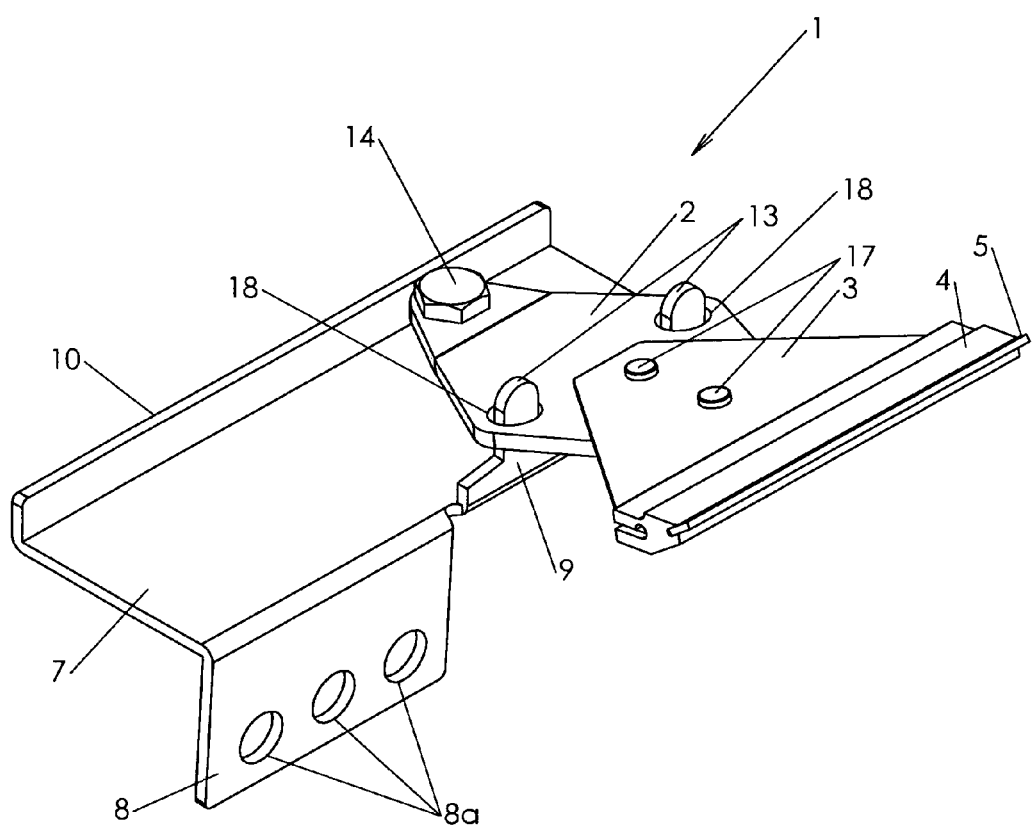
FIG. 7 is a bottom perspective view of the seed/fertilizer boot side scraper.

FIG. 5 is a top view of the seed/fertilizer boot side scraper 1. FIG. 6 is a bottom view of the seed/fertilizer boot side scraper 1. Both of these figures show the parts described previously. As is apparent from these two figures, the scraper attachment member 2 comprises two apertures 18 through which the support protrusions 13 extend. The line labeled as "C" indicates the point at which angle "A" (shown in FIG. 3) begins. FIG. 7 is a bottom perspective view of the seed/fertilizer boot side scraper. It shows the same parts as in FIG. 6, except from a perspective view.

Figure 8:
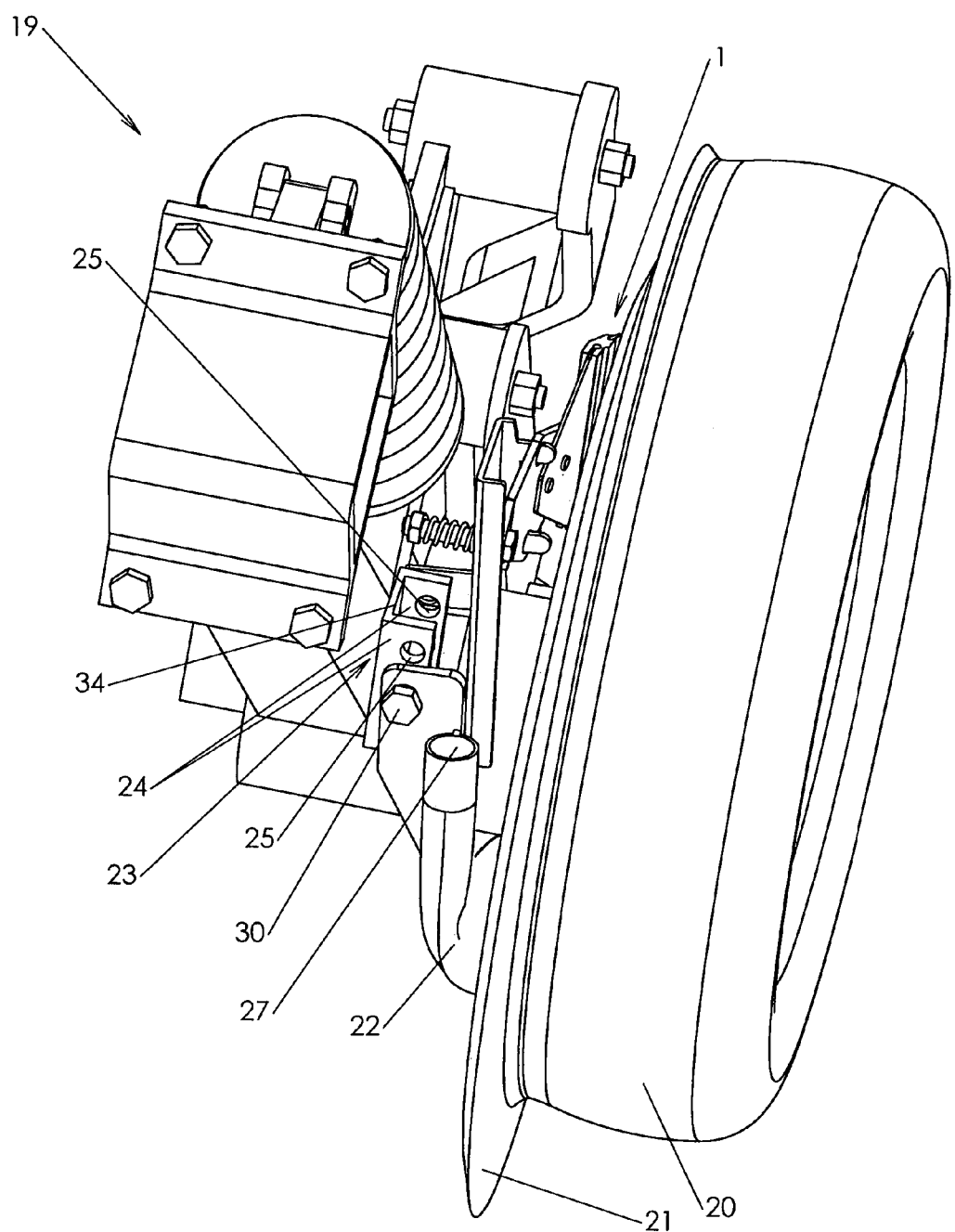
FIG. 8 is a front perspective view of the seeding row unit with the seed boot side scraper installed.
Figure 8A:
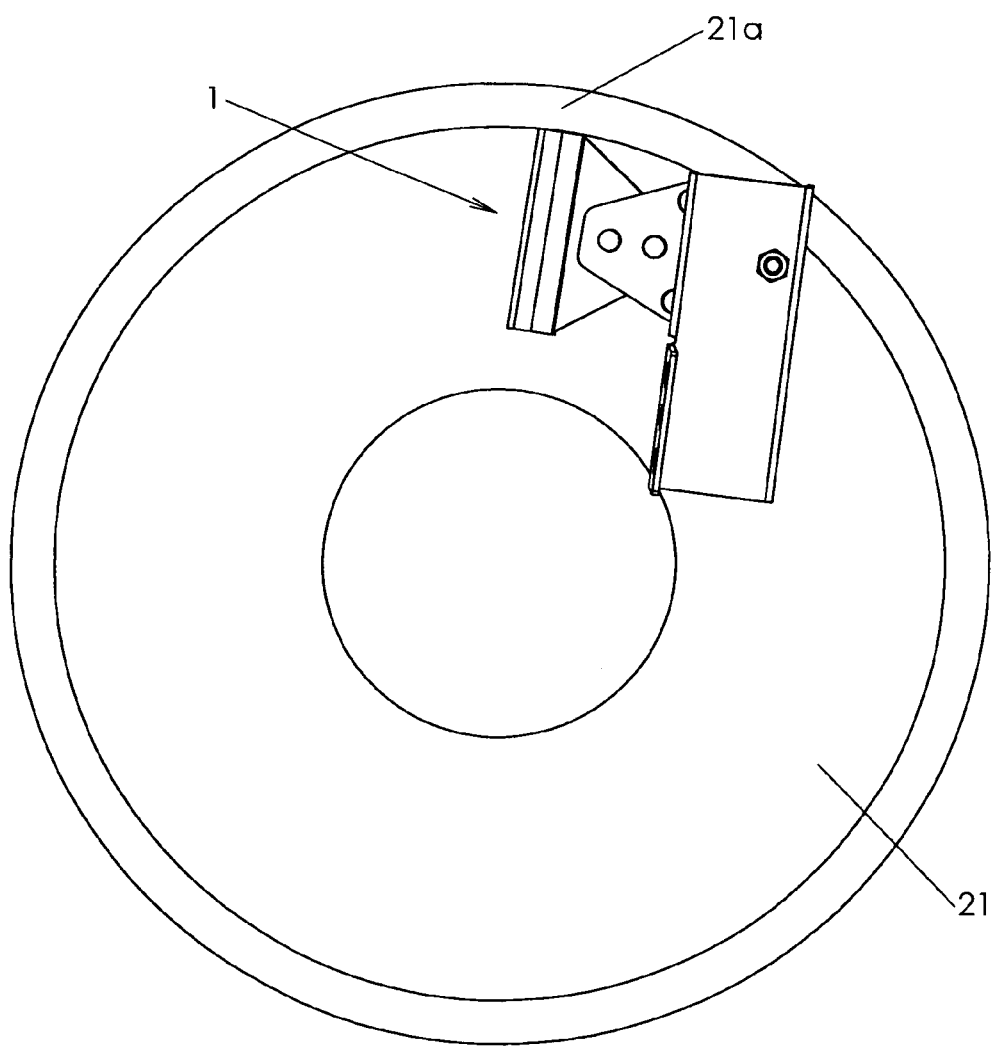
FIG. 8A is a side view of the opener disc showing the position of the seed/fertilizer boot scraper on the disc.

FIG. 8 is a front perspective view of the seeding row unit 19 with the seed boot side scraper 1 installed. The seeding row unit, which is not part of the present invention, comprises a depth wheel 20, an opener disc 21, a seed boot 22, and an installation bracket 23 for mounting the seed boot. The opener disc 21 is beveled only on the side that faces the seed boot 22, and when the scraper is installed, the scraper edge 5 extends from the beginning of the beveled edge inward (see FIG. 8A). The installation bracket 23 comprises two lateral faces 24, each of which comprises three apertures 25. The size and spacing of these apertures 25 corresponds to the three apertures 8a (see FIG. 1) on the attachment arm 8 of the mounting bracket 6. The seed boot is installed by inserting a portion of the seed boot (shown more clearly in FIG. 13) on the outside of the lateral faces 24 of the installation bracket 23 and inserting a pivot bolt 30 through two holes (not shown) in the seed boot and through both lateral faces 24.

The position of the seed boot may be adjusted by moving the seed boot up or down in relation to the installation bracket 23 and moving the pivot bolt accordingly (i.e., inserting it in the lower, middle or upper set of apertures 25 in the installation bracket 23). As the opener disc 21 wears, for example, it may be desirable to move the seed boot up. A seed tube would ordinarily be inserted into a receptacle 27 at the top of the seed boot, but the seed tube is omitted from this and all other figures for clarity.

Figure 9:
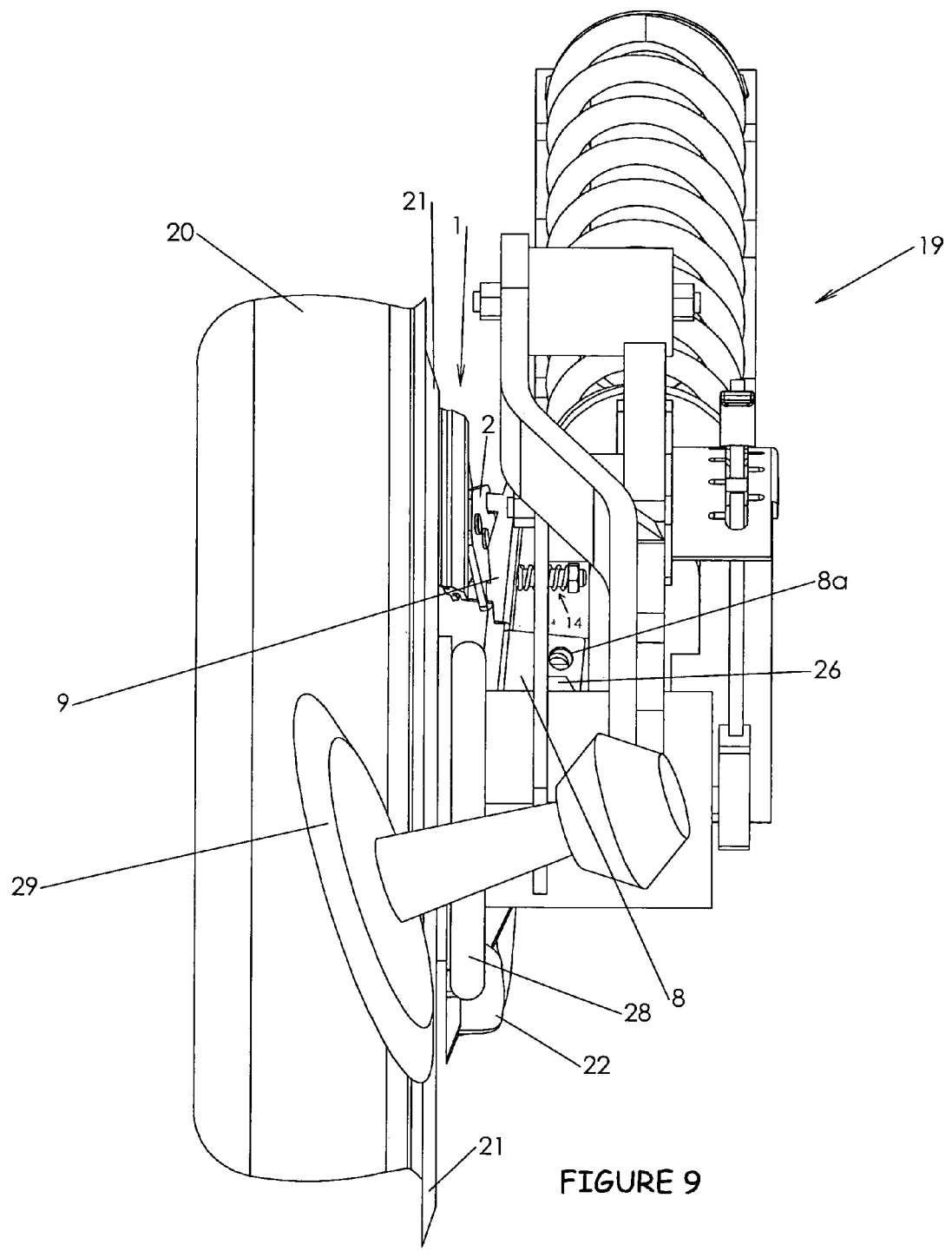
FIG. 9 is a rear perspective view of the seeding row unit with the seed boot side scraper installed.
Figures 10, 11:
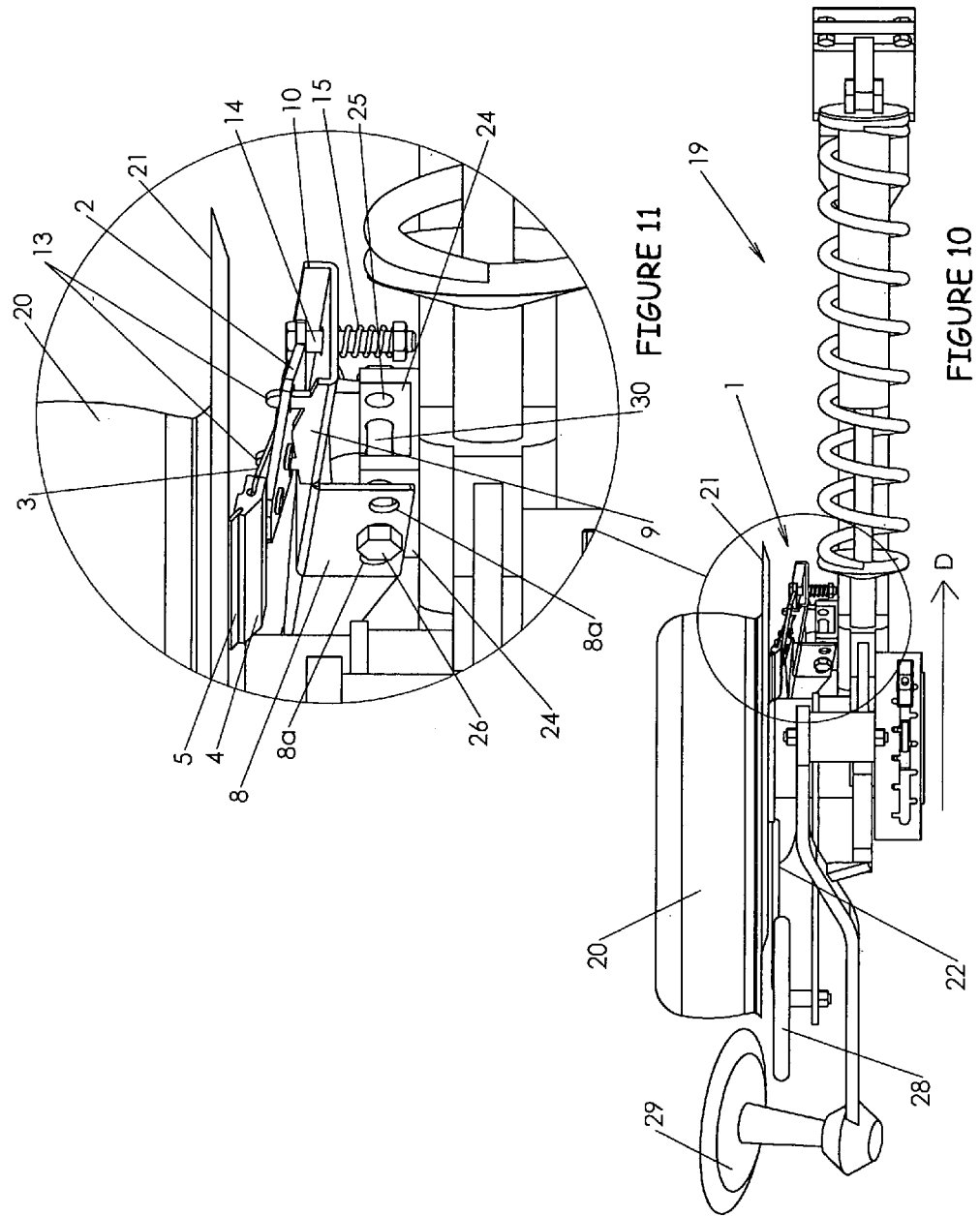
FIG. 10 is a top view of the seeding row unit with the seed boot side scraper installed.
FIG. 11 is an exploded view of the point at which the seed boot side scraper attaches to the main bracket of the seeding row unit.

FIG. 9 is a rear perspective view of the seeding row unit 19 with the seed boot side scraper 1 installed. The seeding row unit 19 further comprises a seed firming wheel 28, which pushes the seed deposited by the seed boot down into the furrow created by the opener disc, and a closing wheel 29, which pushes the soil that was displaced by the opener disc back over the seed in the furrow. In this and the previous figure, the scraper 1 is installed through the middle aperture 8*a* in the attachment arm 8. (The middle aperture is not shown in this figure because it would be directly underneath the nut 26.) FIG. 10 is a top view of the seeding row unit 19 with the seed boot side scraper 1 installed. FIG. 11 is an exploded view of the point at which the seed boot side scraper 1 attaches to the installation bracket 23 of the seeding row unit 19. This figure shows the pivot bolt 30 that connects the seed boot (not shown) to the installation bracket 23. To install the scraper, the nut 26 is unscrewed, and the attachment arm 8 is placed flush up against the seed boot 22 so that the pivot bolt 30 protrudes through the selected apertures 8*a* on the attachment arm 8. The nut 26 is then installed on the pivot bolt 30. A significant advantage of the present invention is that no fasteners or additional parts are necessary to install the scraper.

The rocking motion described in connection with FIG. 1 is important because it allows the scraper to remain flush up against the opener disc 21 as the seed boot 22 encounters soil or debris and is pulled away from the opener disc 21. The seed boot is spring-loaded (not shown), which provides the flexibility for the seed boot to move away from the opener disc 21. As the opener disc 21 rotates, any new soil or debris would first encounter the seed boot and then be scraped away by the scraper. The direction of travel is indicated in FIG. 10 by arrow "D."

Due to the positioning of the scraper in relation to the seed boot (shown more clearly in FIGS. 13 and 14), the spring 15 on the scraper not only holds the scraper flat against the opener disc 21, but it also provides a counter-pressure for the seed boot 22. This counter-pressure helps prevent the seed boot 22 from pulling away from the opener disc 21 as frequently or as far as it otherwise might.

Figure 12:
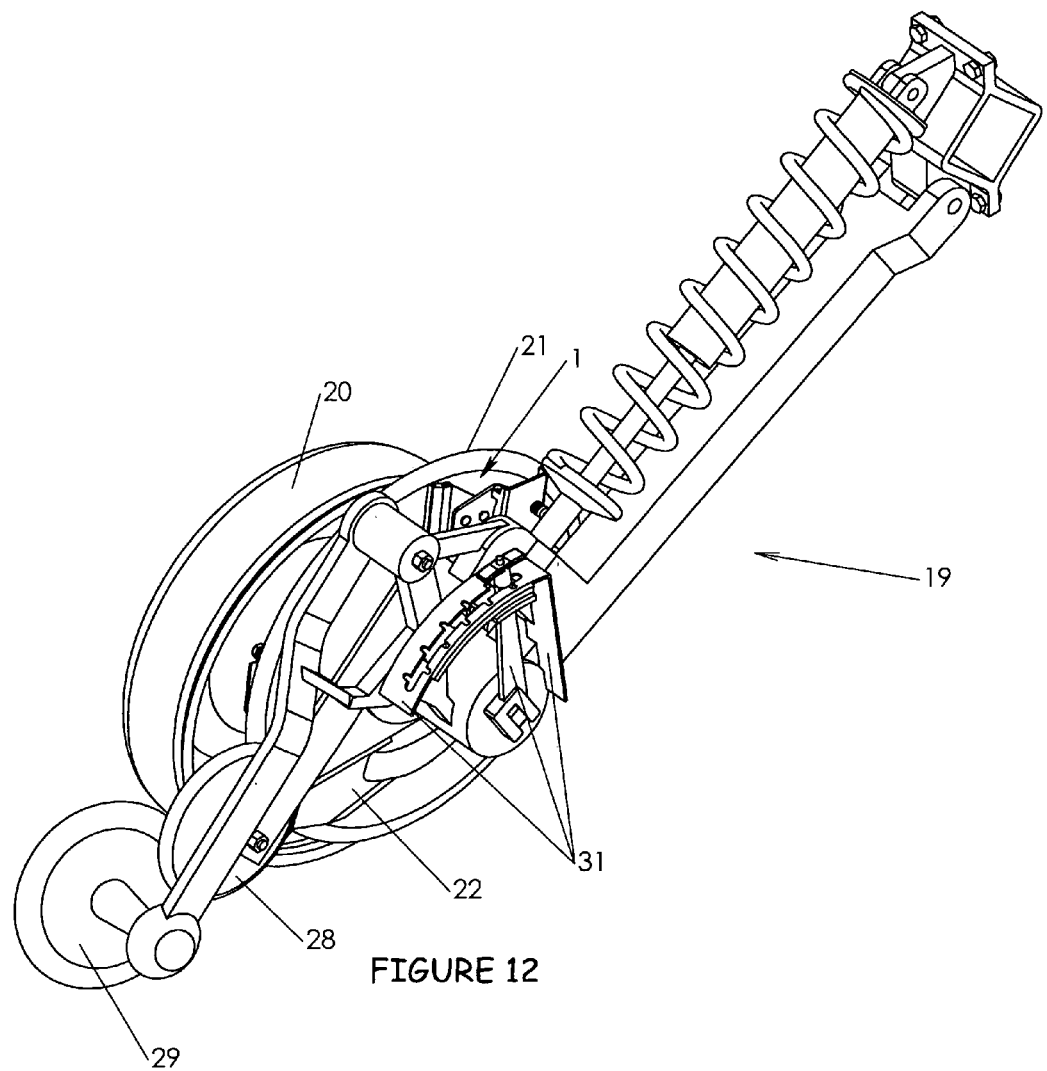
FIG. 12 is a side perspective view of the seeding row unit with the seed boot side scraper installed.

FIG. 12 is a side perspective view of the seeding row unit 19 with the seed boot side scraper 1 installed. This figure also shows the adjustment mechanism 31 that allows the depth wheel to be raised or lowered, thereby changing the relative depth of the depth wheel 20 and opener disc 21 and the depth at which the seed is placed in the ground.

Figure 13:
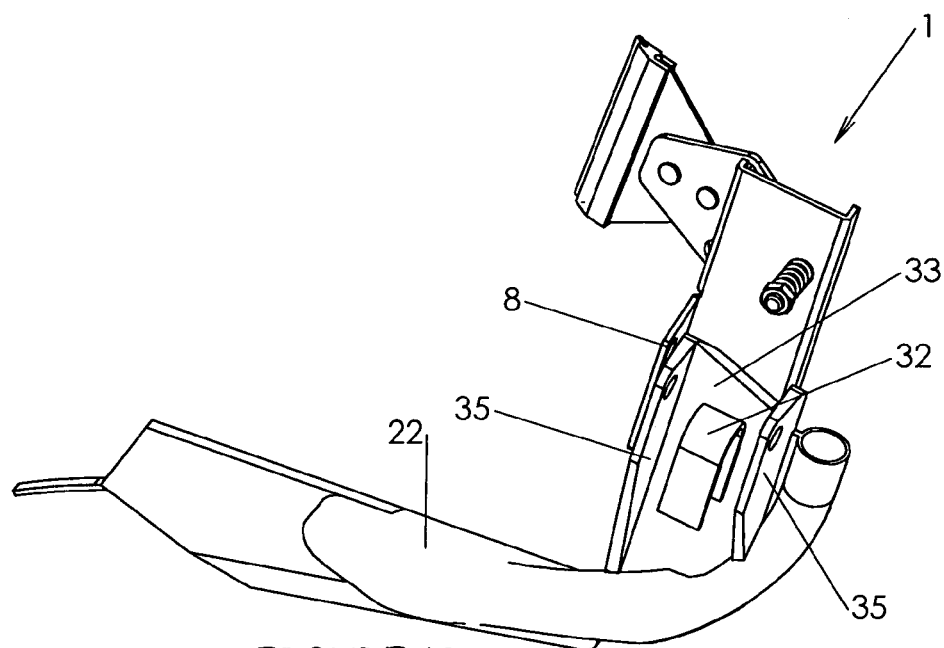
FIG. 13 is a side perspective view of the seed boot in relation to the seed boot side scraper.

FIG. 13 is a side perspective view of the seed boot 22 in relation to the seed boot side scraper 1. A U-spring 32 is positioned in between the backstop 33 of the seed boot and the backstop 34 (see FIG. 8) of the installation bracket 23 (not shown). The purpose of the U-spring 32 is to provide enough pressure to keep the seed boot in position adjacent to the opener disc, although for the reasons explained above, the presence of soil or debris on the opener disc may cause the seed boot to pull away from the opener disc.

Figure 14:
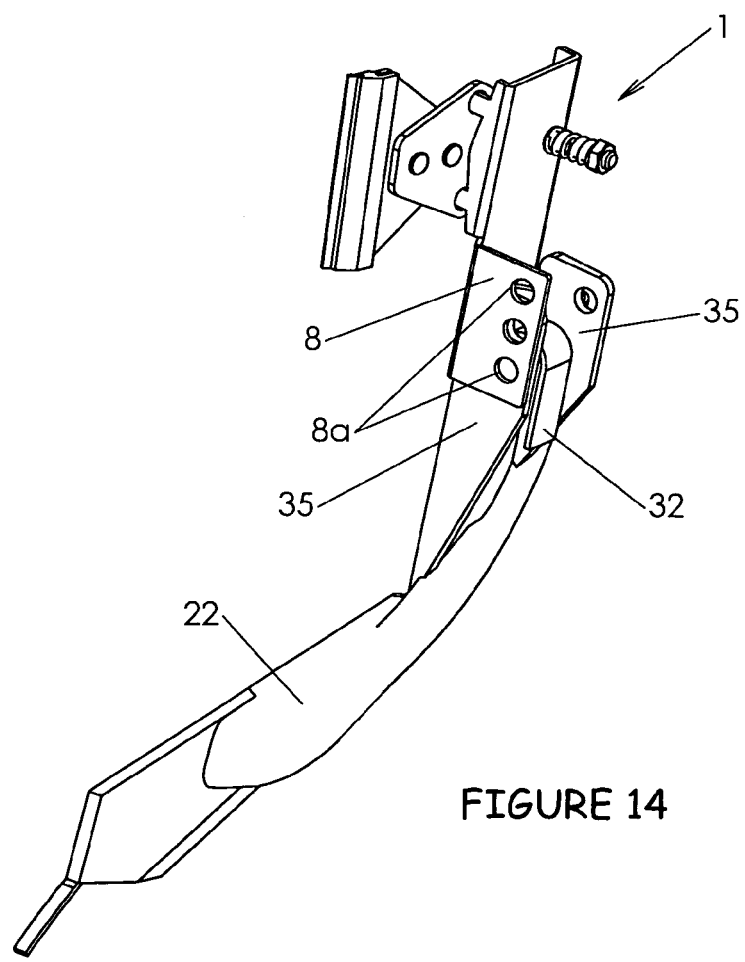
FIG. 14 is a rear perspective view of the seed boot in relation to the seed boot side scraper.

When the seed boot 22 is installed on the seeding row unit, the installation bracket 23 (not shown) is inserted in between the U-spring 32 and the lateral sides 35 of the seed boot 22. The pivot bolt 30 (not shown) is then inserted through the lateral sides 35 of the seed boot 22, through the installation bracket, and through the attachment arm 8 of the scraper. FIG. 14 is a rear perspective view of the seed boot 22 in relation to the seed boot side scraper 1.

Figure 15:
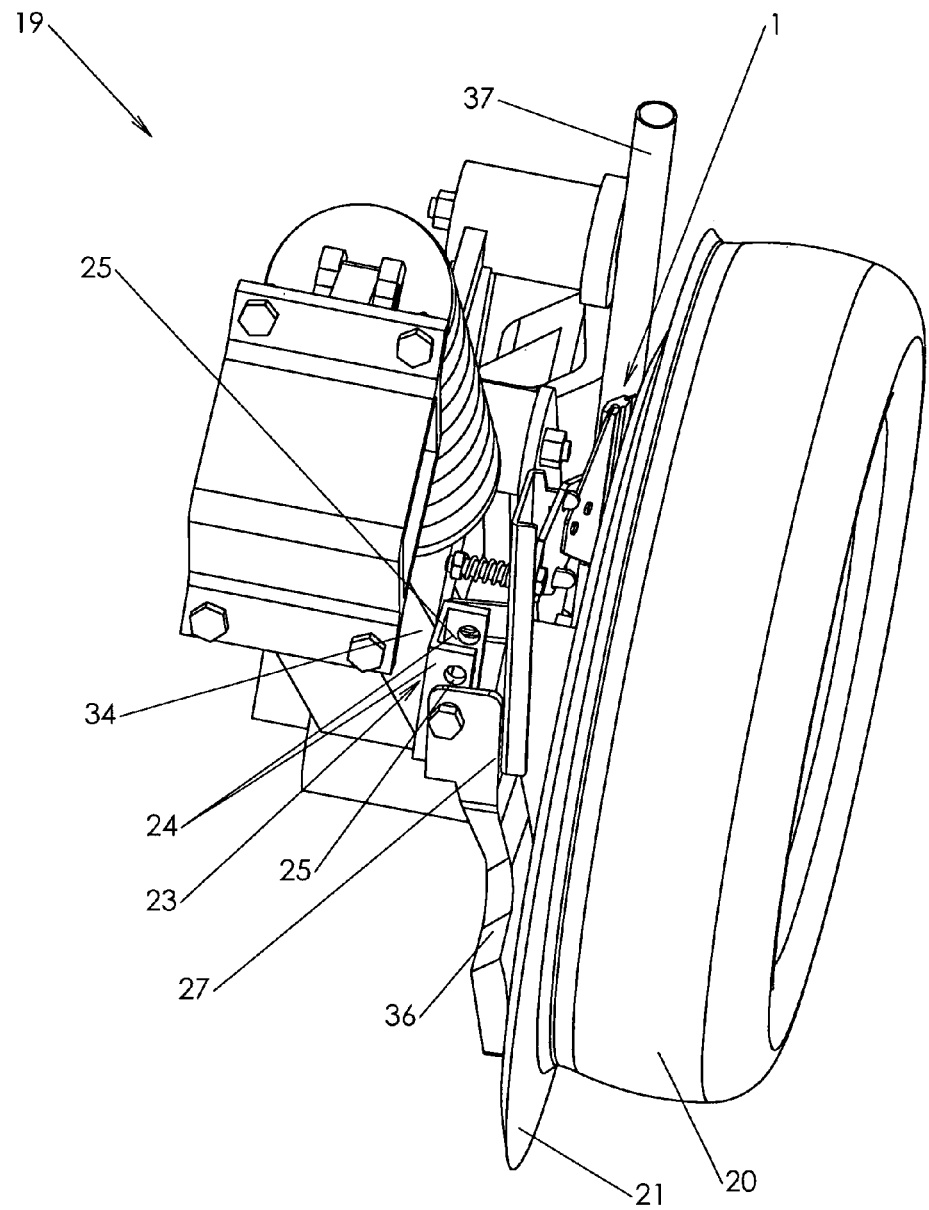
FIG. 15 is a front perspective view of the seeding row unit with the fertilizer boot side scraper installed.

FIG. 15 is a front perspective view of the seeding row unit 19 with the fertilizer boot side scraper 1 installed. The terms "seed boot scraper" and "fertilizer boot scraper" are used interchangeably in this application because they refer to the same embodiment of the scraper. This figure is similar to FIG. 8, except that the seeding row unit 19 is shown with a fertilizer boot 36 rather than a seed boot. When the fertilizer boot is used, the fertilizer tube 37 is on the rear end of the seeding row unit 19, as opposed to the front end, which is where the seed tube is located when the seed boot is used (see FIG. 8, reference number 27).

Figure 16:
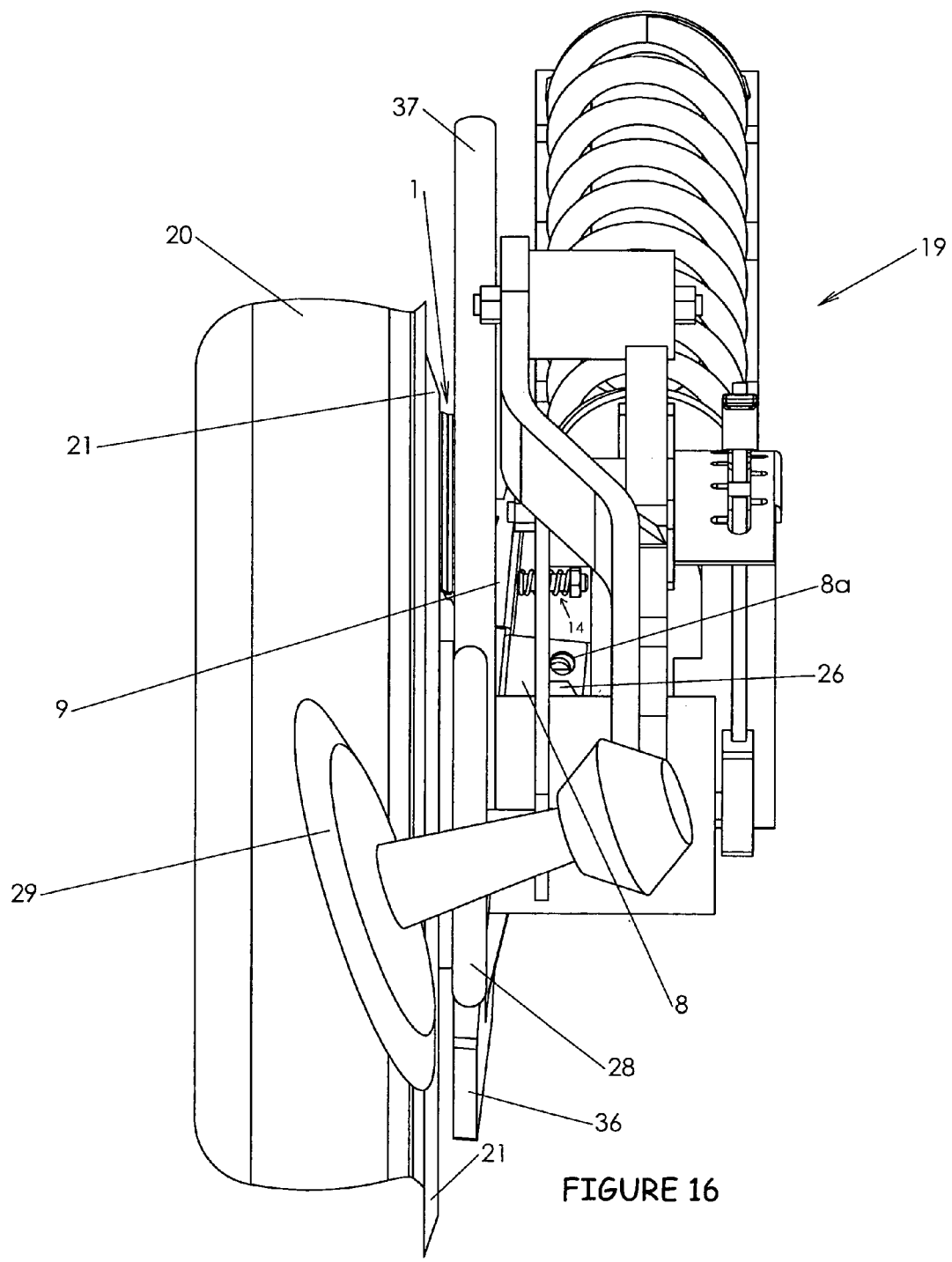
FIG. 16 is a rear perspective view of the seeding row unit with the fertilizer boot side scraper installed.

FIG. 16 is a rear perspective view of the seeding row unit 19 with the fertilizer boot side scraper 1 installed. This figure is similar to FIG. 9, except that the fertilizer boot 36 is shown instead of the seed boot. Due to the location of the fertilizer tube 37, the scraper 1 is largely obscured.

Figure 17:
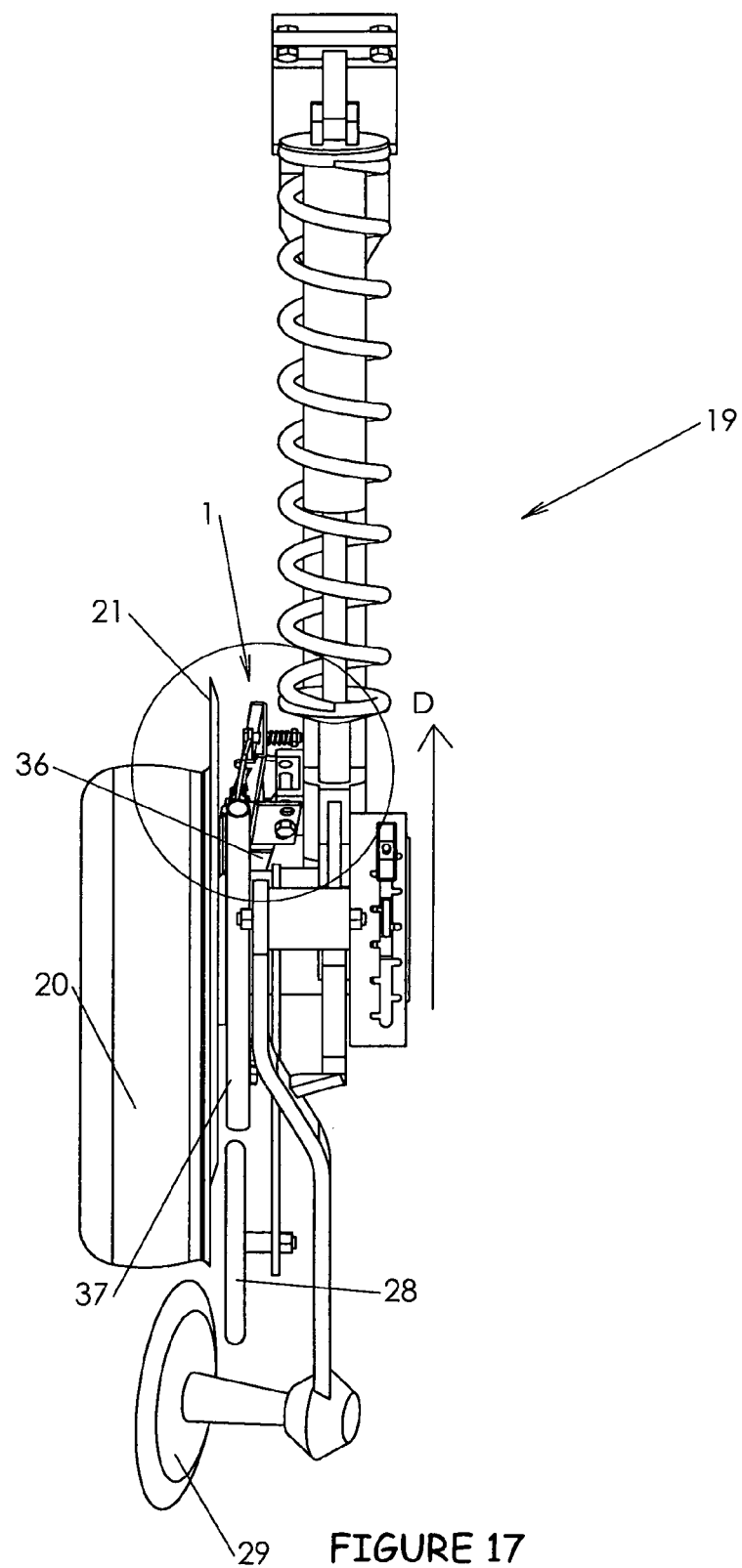
FIG. 17 is a top view of the seeding row unit with the fertilizer boot side scraper installed.

FIG. 17 is a top view of the seeding row unit 19 with the fertilizer boot side scraper 1 installed. This figure is similar to FIG. 10, except that the fertilizer boot 36 is shown instead of the seed boot. A significant advantage of the present invention is that the very same scraper can be used with both the seed boot and the fertilizer boot. In fact, the scraper is installed on the seeding row unit with the fertilizer boot in exactly the same manner as described above for the seeding row unit with the seed boot.

Figure 18:
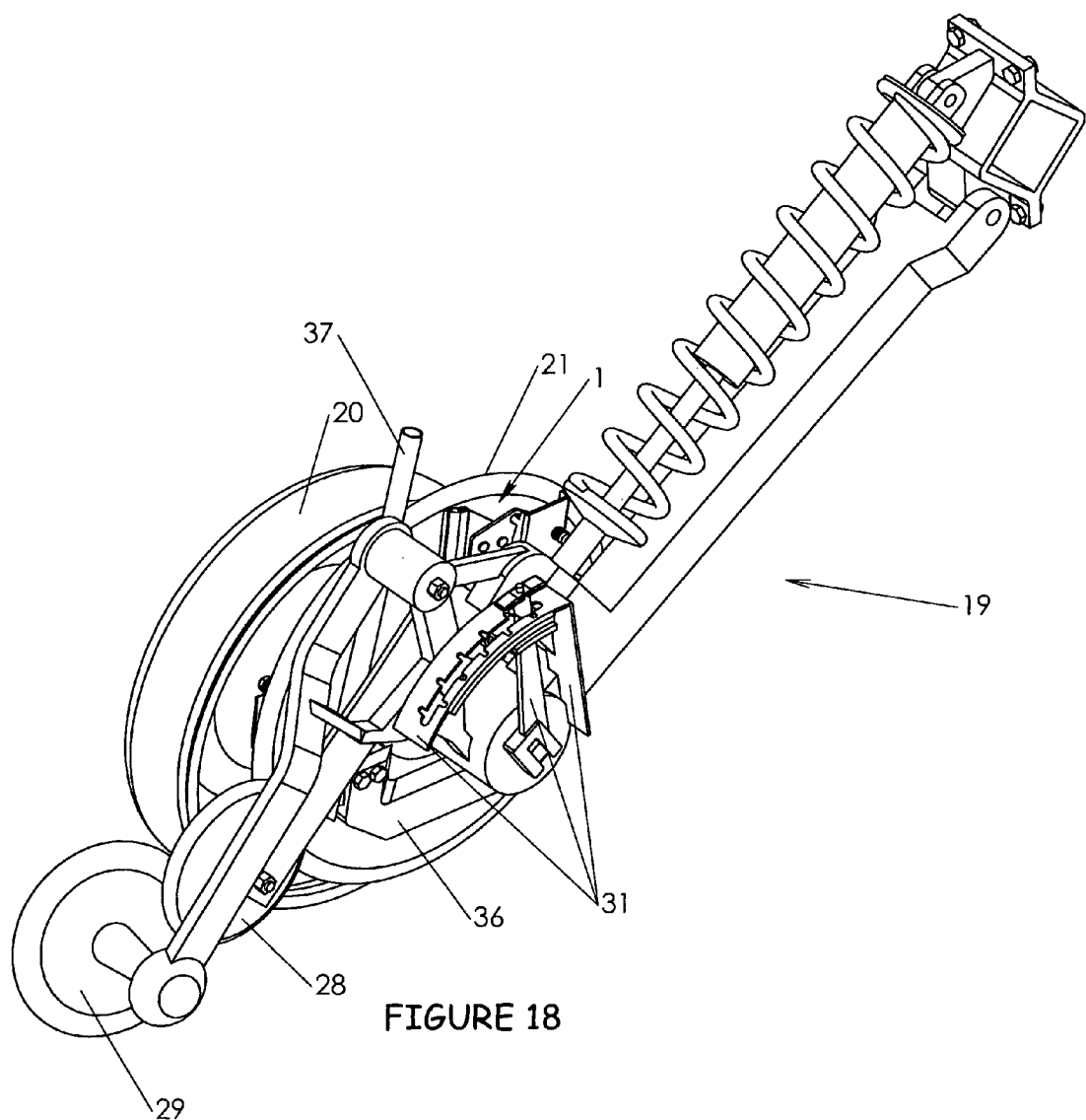
FIG. 18 is a side perspective view of the seeding row unit with the fertilizer boot side scraper installed.

FIG. 18 is a side perspective view of the seeding row unit 19 with the fertilizer boot side scraper 1 installed. The adjustment mechanism 31 works exactly the same regardless of whether the seed or fertilizer boot is installed.

FIG. 19 is a side perspective view of the fertilizer boot 36 in relation to the fertilizer boot side scraper 1. The orientation of the scraper 1 in relation to the fertilizer boot 36, and the orientation of both the scraper 1 and the fertilizer boot 36 in relation to the installation bracket 23 (see FIG. 8) is exactly the same as described above for the seed boot. The fertilizer tube 37 is not shown in this figure, but it would be attached to the end 38 of the fertilizer boot 36. FIG. 20 is a rear perspective view of the fertilizer boot in relation to the fertilizer boot side scraper.

Figure 21:
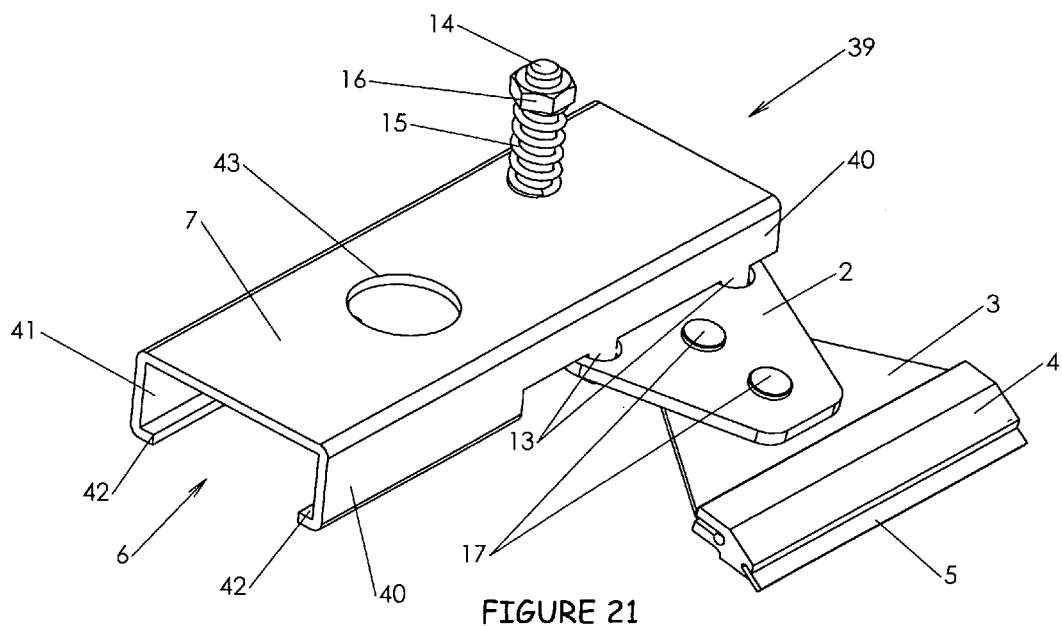
FIG. 21 is a front perspective view of the depth wheel side scraper.

FIG. 21 is a front perspective view of the depth wheel side scraper 39. The depth wheel side scraper has a number of parts in common with the seed/fertilizer boot side scraper, namely, the scraper attachment member 2, scraper plate 3, scraper edge containment member 4, scraper edge 5, primary bolt 14, spring 15 and nut 16. The mounting bracket 6 is the only piece that differs as between the seed/fertilizer boot side scraper and the depth wheel side scraper. In this embodiment, the mounting bracket 6 comprises a main surface 7, a front face 40, a rear face 41, and two embracing flanges 42 that extend inward from the front 40 and rear 41 faces. The main surface 7 comprises an aperture 43 that is used to install the depth wheel (see FIG. 28). The front face 40 extends the entire length of the mounting bracket 6, and two support protrusions 13 hold the scraper attachment member 2 in place. The rear face 41 extends approximately halfway across the length of the mounting bracket 6.

Figure 22:
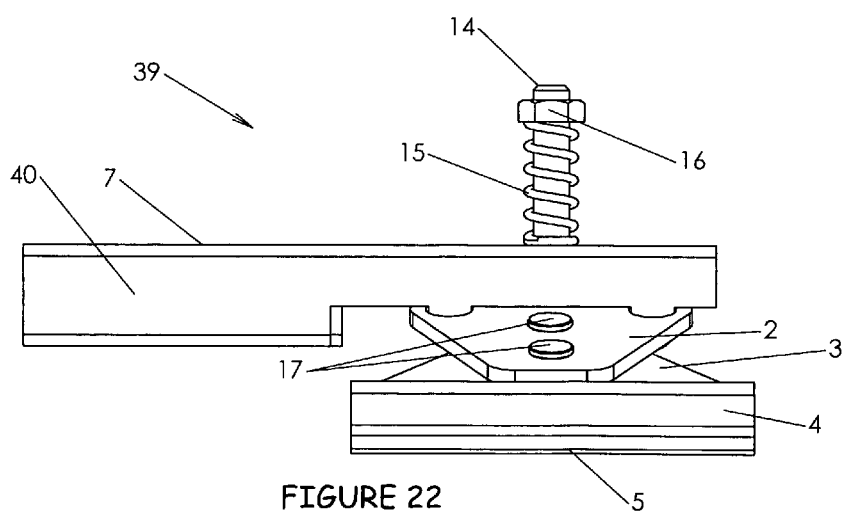
FIG. 22 is a front view of the depth wheel side scraper.

FIG. 22 is a front view of the depth wheel side scraper 39. As shown in this figure, the front face 40 is not angled above the scraper attachment member 2, as is the angled support member 9 of the seed/fertilizer boot side scraper (see FIG. 2). This angle is not needed on the depth wheel side scraper because the scraper edge remains flush against the disc as the height of the depth wheel is adjusted; therefore, it is not necessary to allow for the rocking motion described in connection with the seed/fertilizer boot side scraper. Notwithstanding the foregoing, the depth wheel side scraper could be manufactured with an angled support member 9 (as shown in FIG. 1) if it were deemed necessary.

Figure 23:
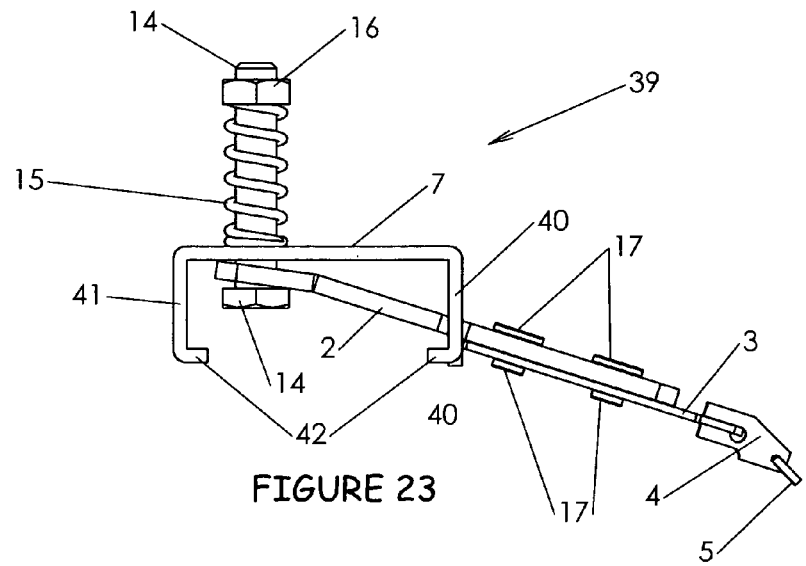
FIG. 23 is a side view of the depth wheel side scraper.

FIG. 23 is a side view of the depth wheel side scraper 39. The scraper attachment member 2 is angled to the same degree as indicated in FIG. 3 (angle "A"). As shown in this figure, on the portion of the mounting bracket 6 that is opposite the scraper attachment member 2 (see also FIG. 21), the front 40 and rear 41 faces are identical in height (i.e., the distance from the main surface 7 to the embracing flanges 42), and they are taller than the supporting flange 10 of the seed/fertilizer boot side scraper (compare FIGS. 3 and 23).

Figure 24:
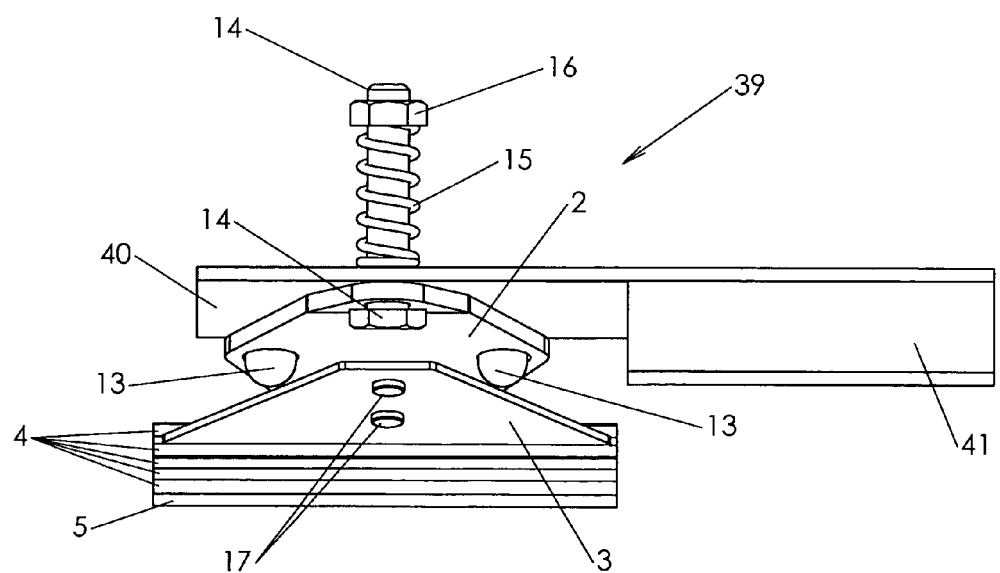
FIG. 24 is a rear view of the depth wheel side scraper.
Figure 25:
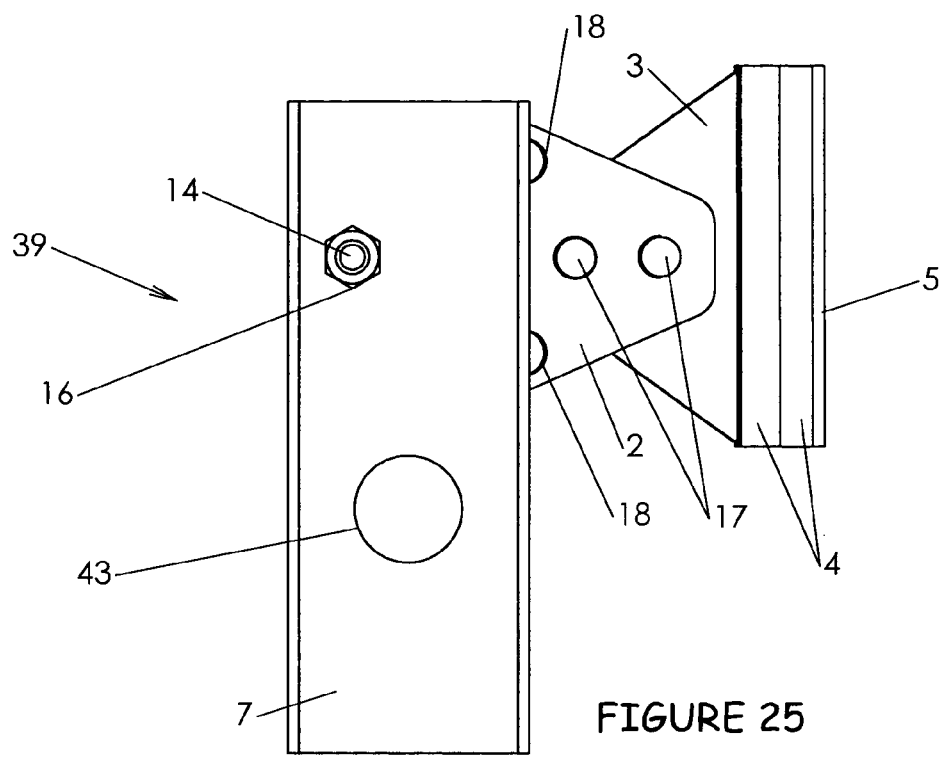
FIG. 25 is a top view of the depth wheel side scraper.
Figure 26:
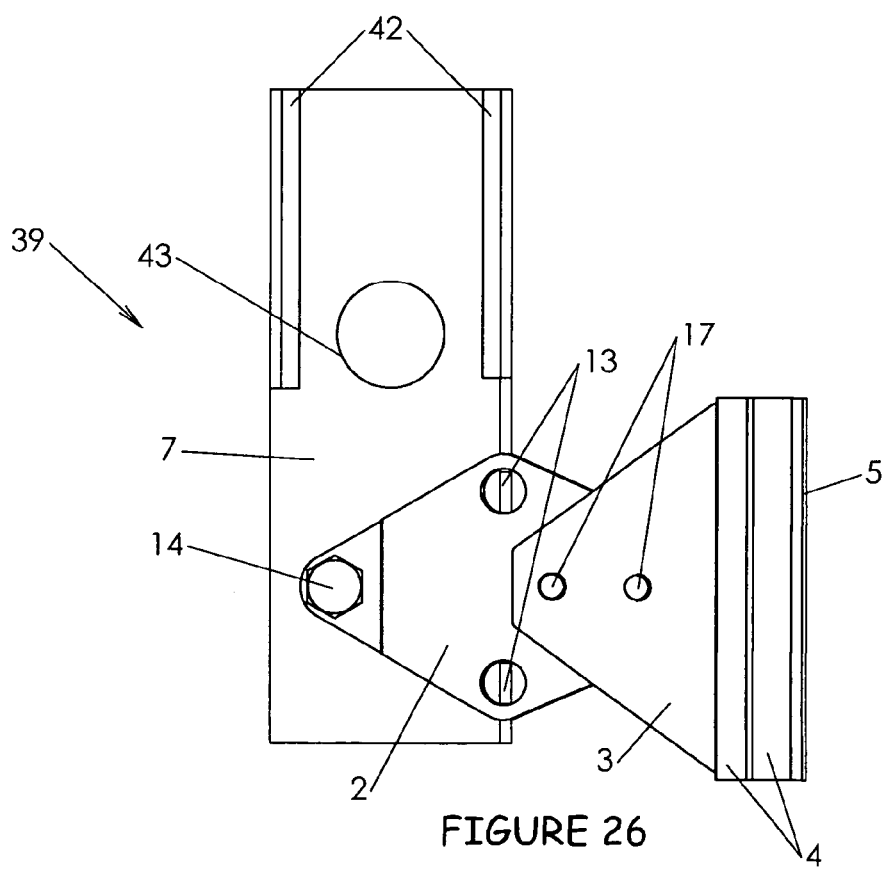
FIG. 26 is a bottom view of the depth wheel side scraper.
Figure 27:
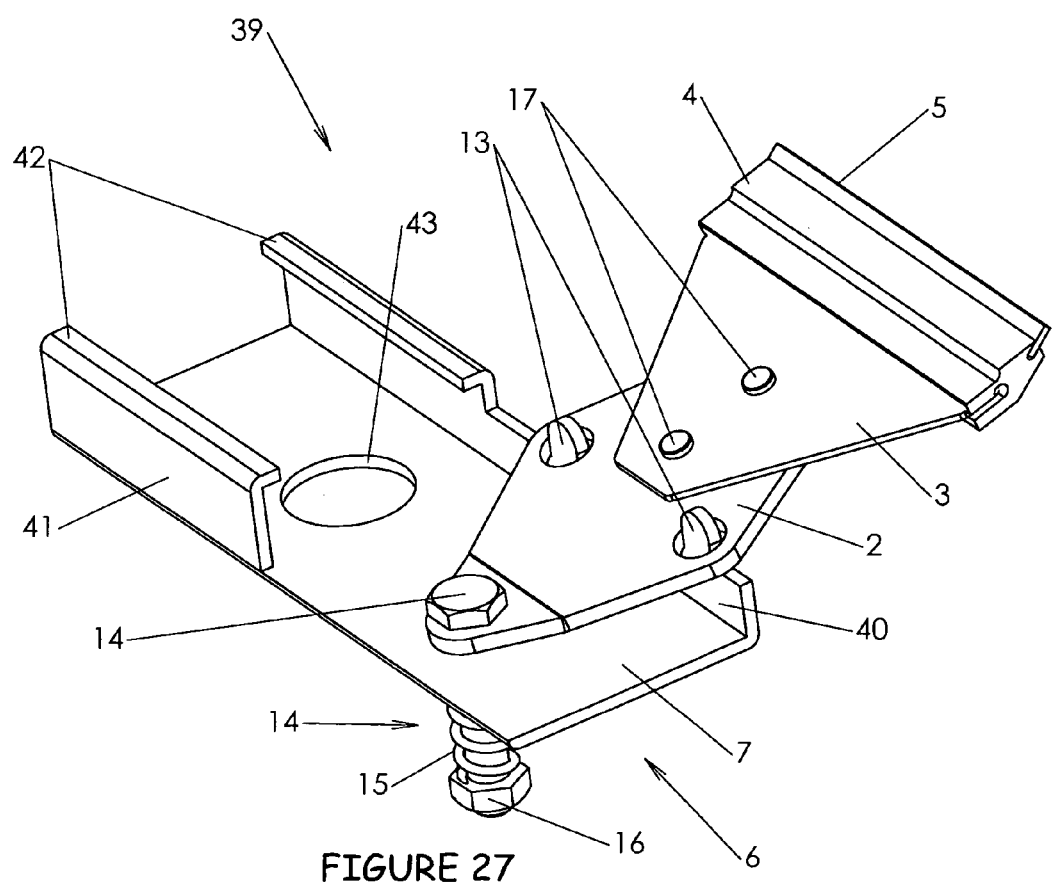
FIG. 27 is a bottom perspective view of the depth wheel side scraper.

FIG. 24 is a rear view of the depth wheel side scraper. FIGS. 25 and 26 are top and bottom views of the depth wheel side scraper 39, respectively. FIG. 27 is a bottom perspective view of the depth wheel side scraper.

Figure 28:
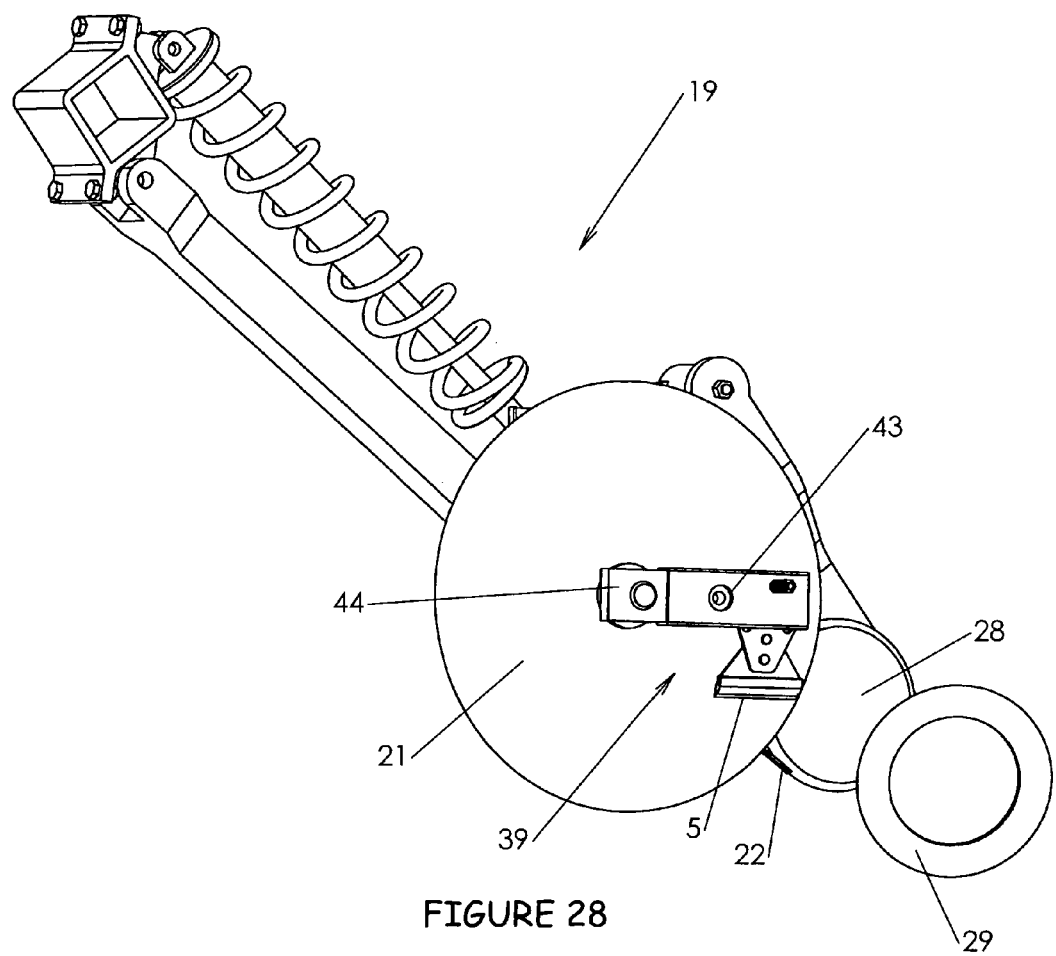
FIG. 28 is a side perspective view of the seeding row unit with the depth wheel side scraper installed.

FIG. 28 is a side perspective view of the seeding row unit 19 with the depth wheel side scraper 39 installed. In this figure, the depth wheel 20 has been removed so that the scraper is visible. In order to install the scraper, the depth wheel is removed, and the scraper slides onto the depth wheel adjustment arm 44. As with the seed/fertilizer boot side scraper, no additional parts are needed to install the scraper. The purpose of the embracing flanges 42 (not shown) is to hold the scraper onto the adjustment arm 44. The adjustment mechanism shown in FIG. 12 causes the depth wheel adjustment arm 44 to move, which in turn raises or lowers the depth wheel (not shown) and scraper 39. As noted above, the scraper edge 5 remains flush against the disc whenever the height of the depth wheel is adjusted.

Figure 29:
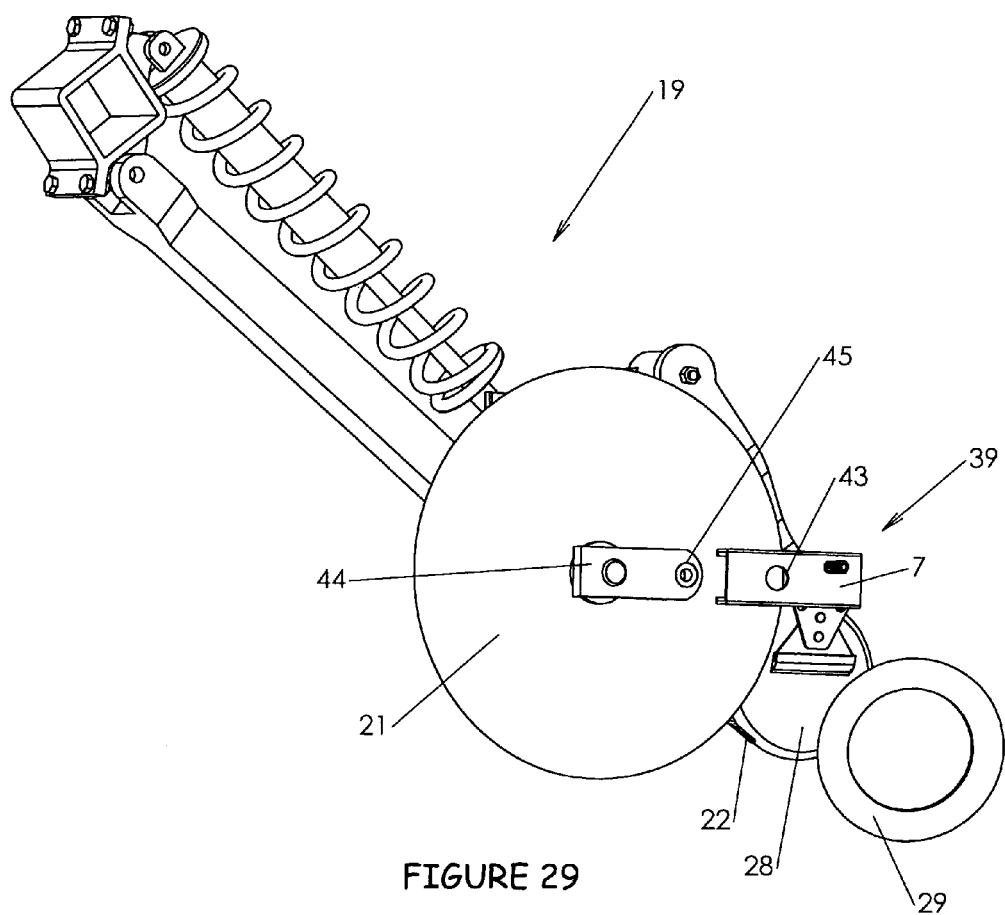
FIG. 29 is side perspective view of the seeding row unit with the depth wheel side scraper immediately prior to installation of the scraper.

FIG. 29 is side perspective view of the seeding row unit 19 with the depth wheel side scraper 39 immediately prior to installation of the scraper. The depth wheel is attached by a bolt (not shown) that is inserted into an aperture 45 in the depth wheel adjustment arm 44. When the depth wheel side scraper 39 is installed, this aperture 45 lines up with the aperture 43 on the main surface 7 of the scraper 39.

Figure 30:
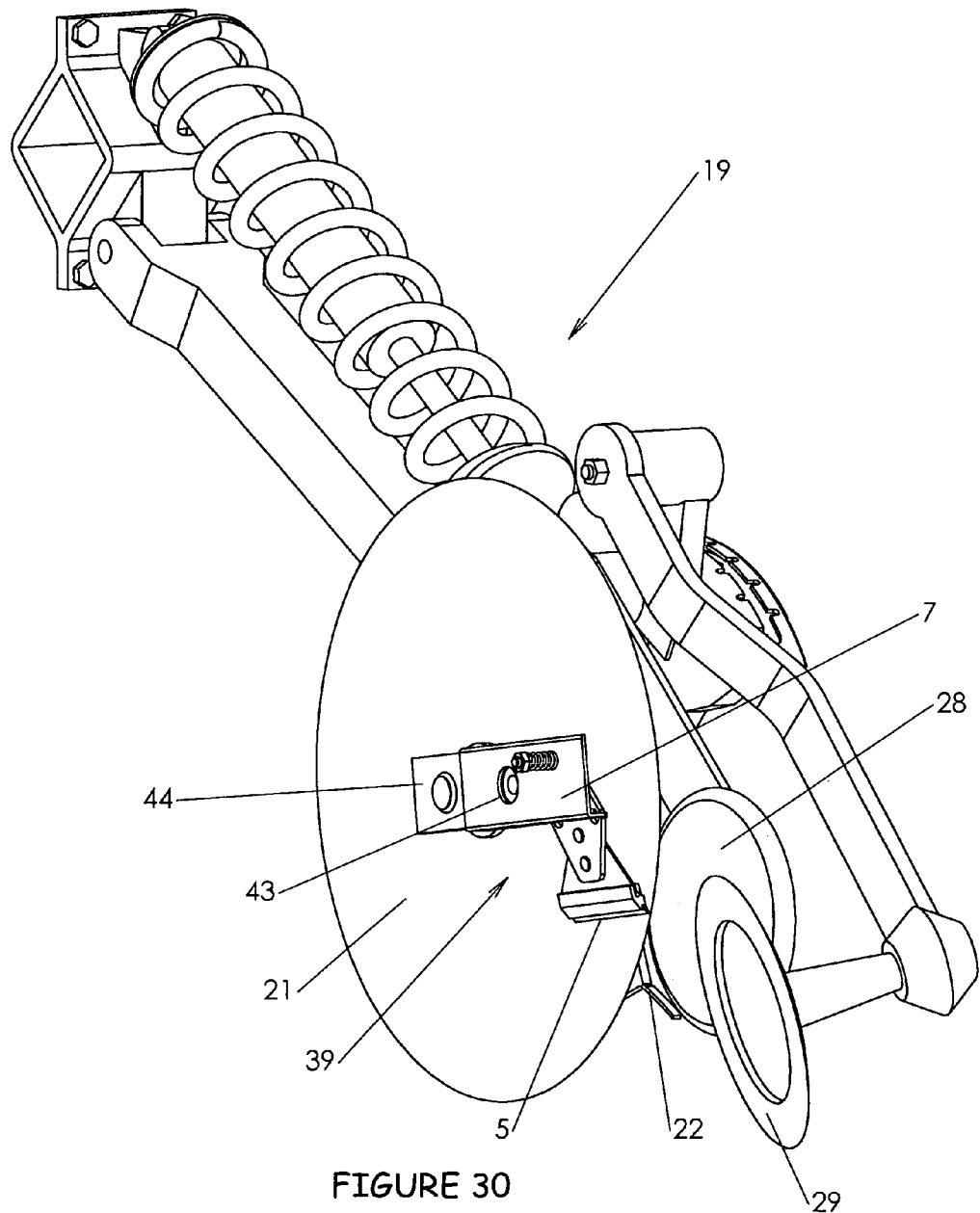
FIG. 30 is a perspective view of the seeding row unit with the depth wheel side scraper installed.

FIG. 30 is a rear perspective view of the seeding row unit 19 with the depth wheel side scraper 39 installed. This figure is similar to FIG. 28, except that the seeding row unit 19 is shown from a different angle. As shown in this figure, the scraper edge 5 extends to the outer edge of the opener disc 21. In this embodiment, as in the previous embodiment, the spring serves to keep the scraper edge 5 flat against the opener disc 21. Without a depth wheel side scraper 39, the depth wheel essentially performs the function of rubbing soil and debris off of the opener disc (see FIG. 8), which can cause significant deterioration of the rubber on the depth wheel.

Figure 31:
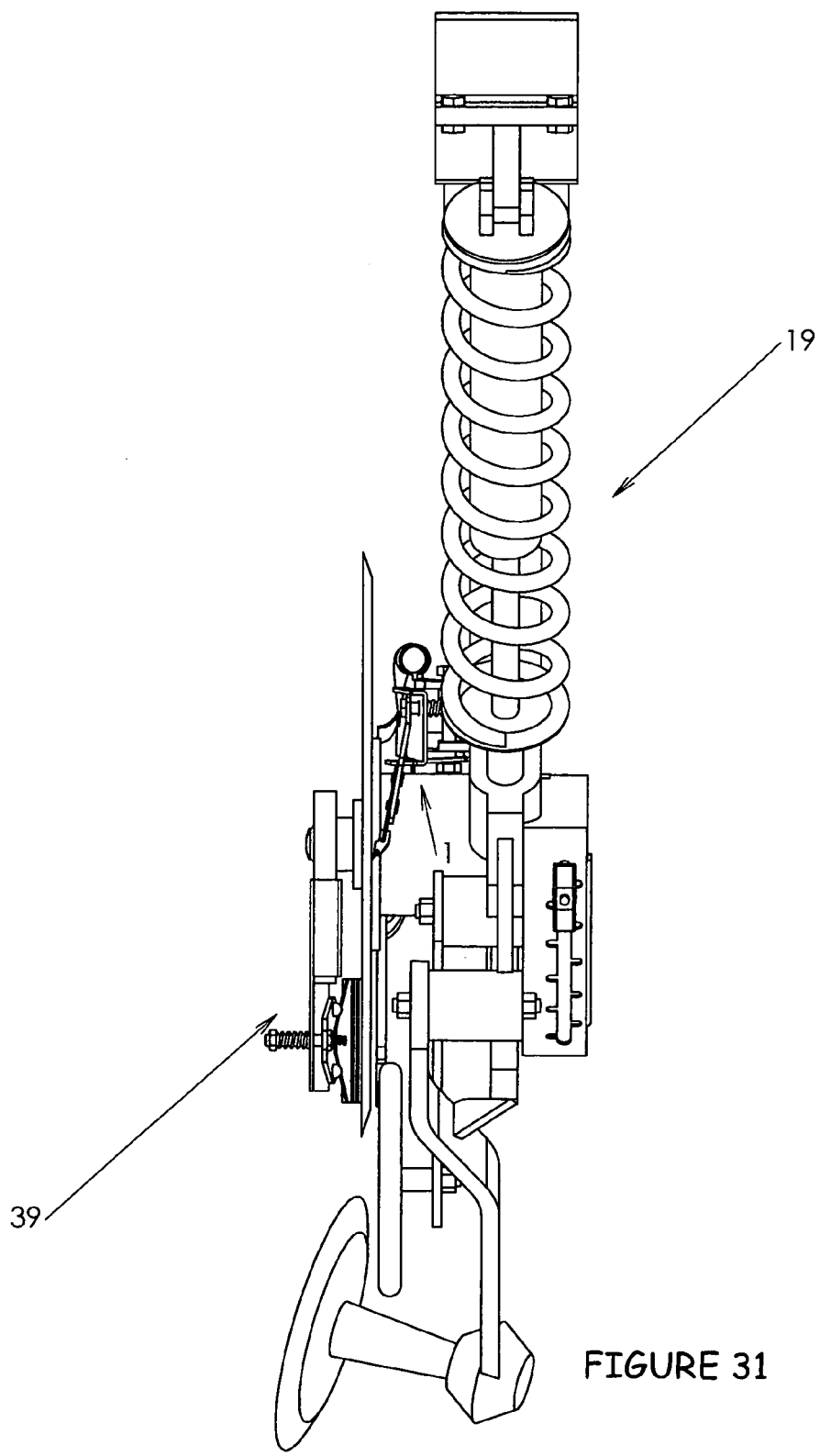
FIG. 31 is a top view of the seeding row unit with both the seed/fertilizer boot side scraper and depth wheel side scraper installed.

FIG. 31 is a top view of the seeding row unit 19 with both the seed/fertilizer boot side scraper 1 and depth wheel side scraper 39 installed. As far as the inventors are aware, there is no other product or invention that addresses the problem of removing soil and debris from both sides of the opener disc.

It should be noted that although the seed/fertilizer boot side scraper is shown in these figures (see, in particular, FIG. 1) with the attachment arm on the right-hand side and the scraper attachment member on the left-hand side, the present invention is not limited to that particular orientation. In an alternate embodiment, the attachment arm is on the left-hand side, and the scraper attachment member is on the right-hand side. These two embodiments would both be used on the same air seeder, with one embodiment on one side of a row of opener discs (i.e., right of center) and the other embodiment on the other side of the row of opener discs (i.e., left of center). The same is true of the depth wheel side scraper—the scraper attachment member may be on the left- or right-hand side of the scraper, depending on the side of the air seeder on which it is used.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A scraper for a single-disc opener air seeder, comprising:
   (a) a mounting bracket;
   (b) a scraper attachment member;
   (c) a scraper plate;
   (d) a scraper edge containment member;
   (e) a scraper edge;
   (f) a bolt;
   (g) a spring; and
   (h) a nut;
   wherein the scraper attachment member is attached to the mounting bracket by the bolt;
   wherein the mounting bracket comprises a main surface;
   wherein the bolt comprises a top end, and the nut is screwed onto the top end of the bolt;
   wherein the spring lies between the main surface of the mounting bracket and the nut on the top end of the bolt;
   wherein the scraper attachment member is connected to the scraper plate;
   wherein the scraper plate is connected to the scraper edge containment member; and
   wherein the scraper edge containment member is connected to the scraper edge; and
   wherein the scraper edge is parallel to the main surface of the mounting bracket.

2. The scraper of claim 1, wherein the scraper attachment member is angled downward, and wherein the angle is in the range of seven (7) to ten (10) degrees.

3. The scraper of claim 1, wherein the mounting bracket further comprises an angled support member, an attachment arm, and a supporting flange;
   wherein the angled support member comprises two angled edges, a center point, and two support protrusions;
   wherein the scraper attachment member comprises two apertures;
   wherein the support protrusions extend through the apertures in the scraper attachment member;
   wherein the angled edges of the angled support member, in combination with the spring, allow the scraper attachment member to rock from one side to another;
   wherein the attachment arm comprises three apertures;
   wherein the attachment arm is roughly perpendicular to the main surface of the mounting bracket;
   wherein the air seeder to which the scraper attaches comprises an installation bracket;
   wherein the installation bracket comprises three apertures; and
   wherein when the scraper is installed, the three apertures on the attachment arm of the scraper line up with the three apertures on the installation bracket on the air seeder.

4. The scraper of claim 1, wherein the mounting bracket further comprises a front face, a rear face, and two embracing flanges;
   wherein the front face comprises two support protrusions;
   wherein the scraper attachment member comprises two apertures;
   wherein the support protrusions extend through the apertures in the scraper attachment member;
   wherein the air seeder to which the scraper attaches comprises a depth wheel and an attachment arm for the depth wheel; and wherein the scraper slides onto the attachment arm, and the two embracing flanges of the scraper hold the scraper onto the attachment arm.

5. The scraper of claim 4, wherein the front face extends the entire length of the mounting bracket, the rear face extends approximately halfway across the length of the mounting bracket, and each of the embracing flanges extends approximately halfway across the length of the mounting bracket.

6. The scraper of claim 1, wherein the air seeder to which the scraper attaches comprises an opener disc, wherein the opener disc is beveled on one side, wherein the scraper is installed on the side of the opener disc that has the beveled edge, wherein when the scraper is installed, the scraper edge extends from the beginning of the beveled edge on the opener disc inward, wherein the opener disc rotates in a direction of travel, and wherein the scraper edge is oriented against the direction of travel of the opener disc.

7. The scraper of claim 1, wherein the air seeder to which the scraper attaches comprises an opener disc, wherein the opener disc is beveled on one side, wherein the scraper is installed on the side of the opener disc that does not have a beveled edge, wherein the opener disc has an outer edge, and wherein when the scraper is installed, the scraper edge extends from the outer edge of the opener disc inward.

* * * * *